United States Patent
Allen et al.

(10) Patent No.: US 11,105,996 B2
(45) Date of Patent: Aug. 31, 2021

(54) FIBER OPTIC CABLE FIXATION DEVICE AND FIBER OPTIC CABLE MOUNTING SYSTEM COMPRISING SAME

(71) Applicant: COMMSCOPE CONNECTIVITY BELGIUM BVBA, Kessel-Lo (BE)

(72) Inventors: Barry Wayne Allen, Siler City, NC (US); David Jan Irma Van Baelen, Winksele (BE); Eric Schurmans, Hogen-Geetbets (BE)

(73) Assignee: CommScope Connectivity Belgium BVBA, Kessel-Lo (BE)

( * ) Notice: Subject to any disclaimer, the term of this patent is extended or adjusted under 35 U.S.C. 154(b) by 72 days.

(21) Appl. No.: 16/489,200

(22) PCT Filed: Feb. 26, 2018

(86) PCT No.: PCT/EP2018/054717
§ 371 (c)(1),
(2) Date: Aug. 27, 2019

(87) PCT Pub. No.: WO2018/154125
PCT Pub. Date: Aug. 30, 2018

(65) Prior Publication Data
US 2020/0064579 A1   Feb. 27, 2020

Related U.S. Application Data

(60) Provisional application No. 62/464,061, filed on Feb. 27, 2017.

(51) Int. Cl.
*G02B 6/44* (2006.01)

(52) U.S. Cl.
CPC ................... *G02B 6/4477* (2013.01)

(58) Field of Classification Search
CPC .... G02B 6/4477; G02B 6/4439; G02B 6/4471
See application file for complete search history.

(56) References Cited

U.S. PATENT DOCUMENTS

| | | | |
|---|---|---|---|
| 5,793,920 A | 8/1998 | Wilkins et al. | |
| 8,903,216 B2 | 12/2014 | Thompson et al. | |
| 8,989,550 B2 | 3/2015 | Allen et al. | |
| 9,465,180 B2 | 10/2016 | Marmon et al. | |
| 10,520,695 B2 * | 12/2019 | Jaksons | G02B 6/4452 |
| 2012/0177334 A1 | 7/2012 | Holmberg et al. | |
| 2015/0378106 A1 | 12/2015 | Allen et al. | |
| 2017/0003467 A1 | 1/2017 | Jaksons et al. | |

FOREIGN PATENT DOCUMENTS

WO    2016/205340 A1    12/2016

OTHER PUBLICATIONS

International Search Report and Written Opinion of the International Searching Authority for International Patent Application No. PCT/EP2018/054717 dated Jul. 11, 2018, 19 pages.

* cited by examiner

*Primary Examiner* — John Bedtelyon
(74) *Attorney, Agent, or Firm* — Merchant & Gould P.C.

(57) ABSTRACT

The present disclosure relates to cable fixation devices for securing cables such as fiber optic cables to structures such as enclosures, panels, trays, frames or the like. The cable fixation devices can be configured to allow cables to be attached thereto while the fixation devices are disconnected from the structures. The fixation devices can be mounted in densely stacked configurations.

14 Claims, 20 Drawing Sheets

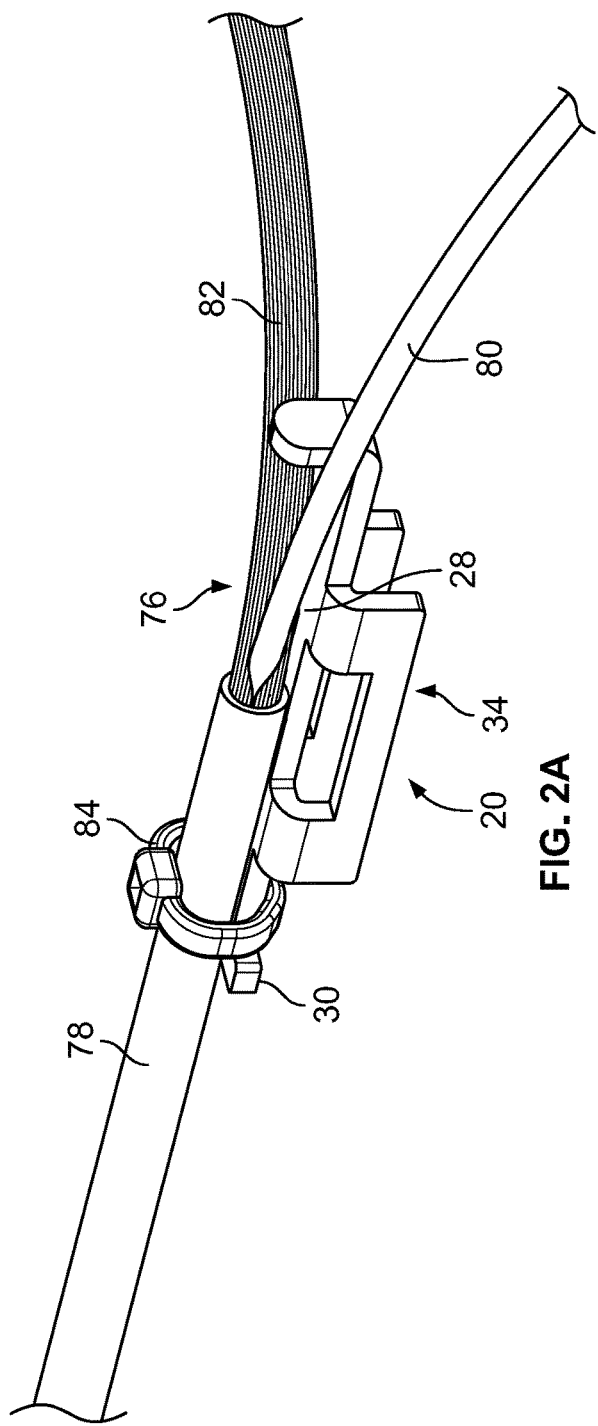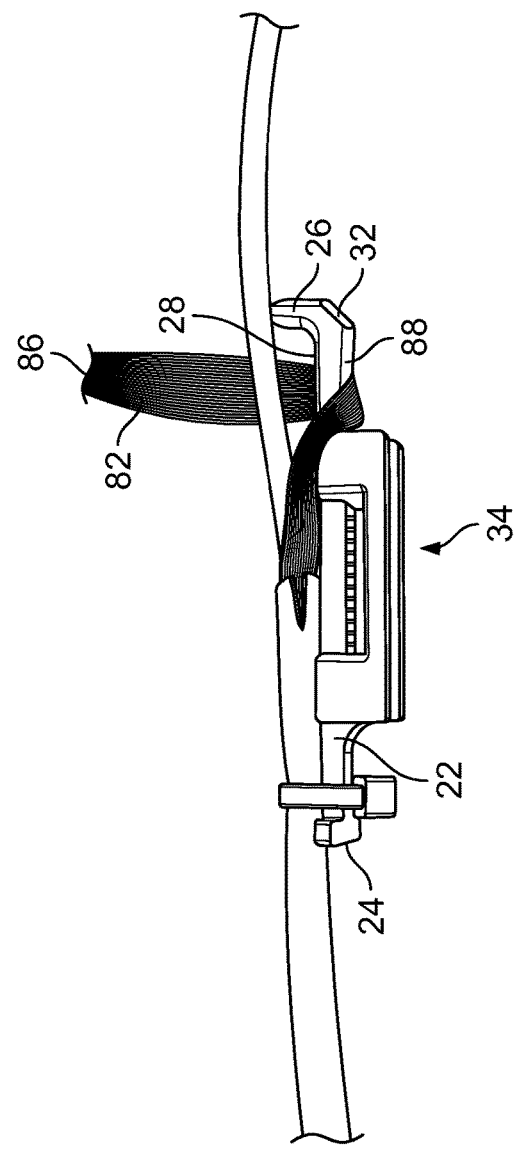

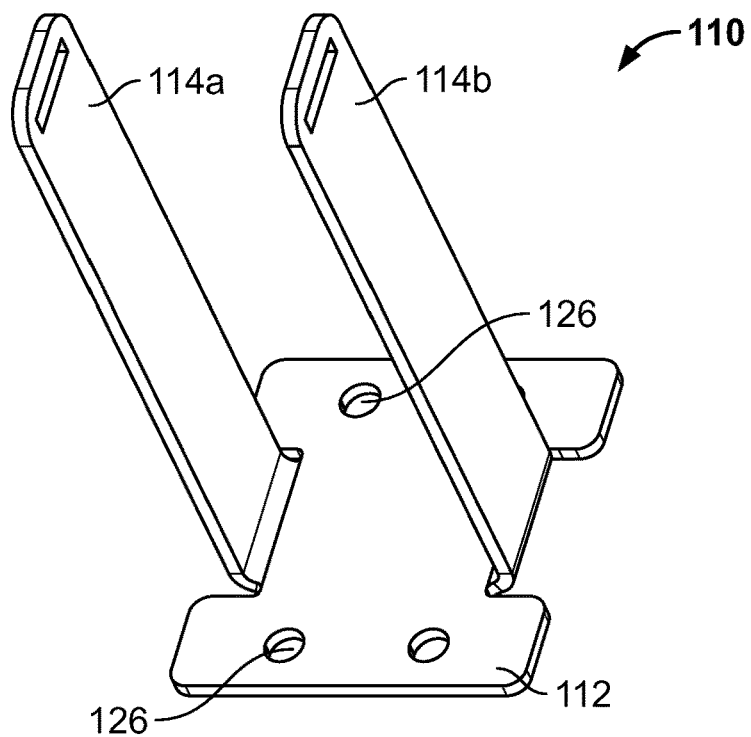
FIG. 6A
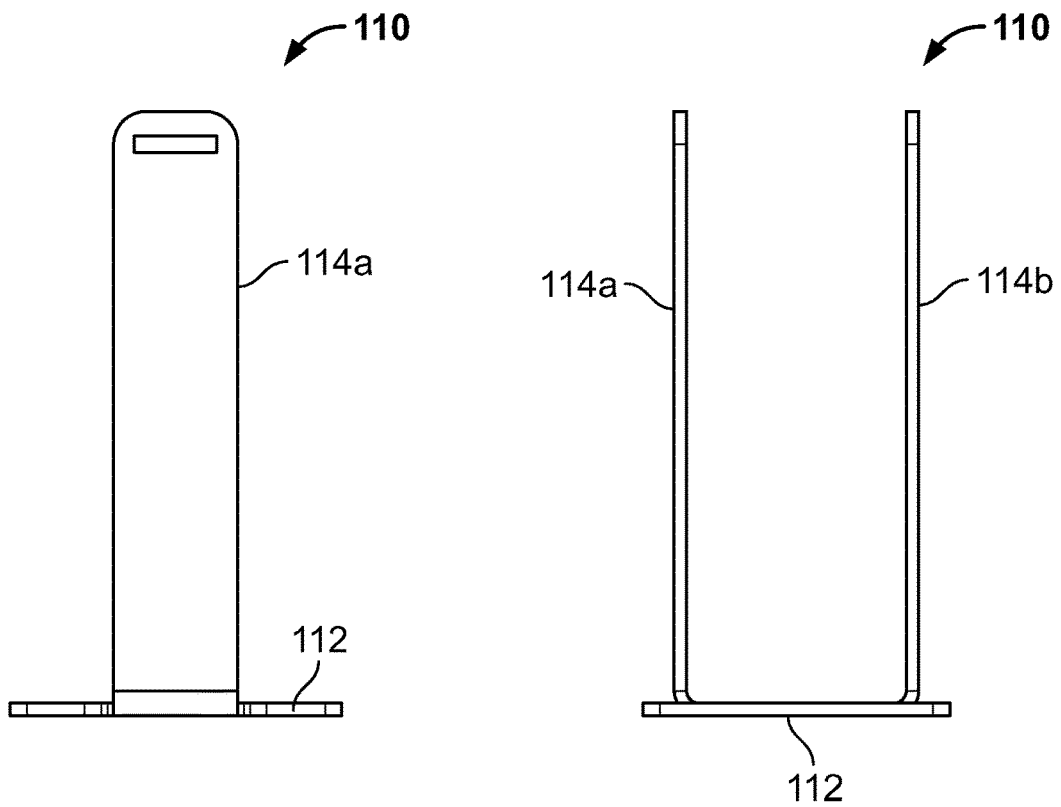
FIG. 6B  FIG. 6C

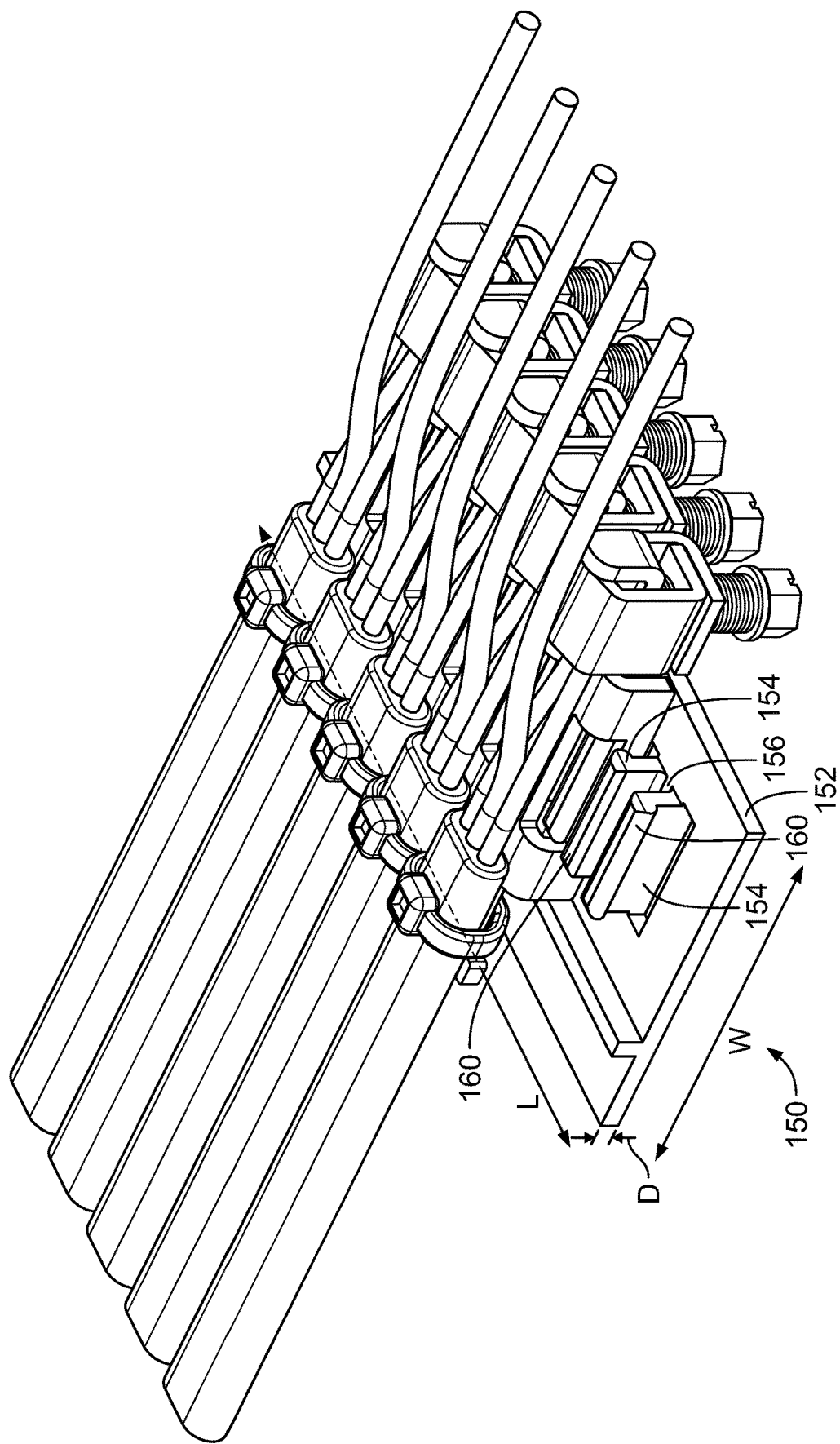

FIBER OPTIC CABLE FIXATION DEVICE AND FIBER OPTIC CABLE MOUNTING SYSTEM COMPRISING SAME

CROSS-REFERENCE TO RELATED APPLICATION

This application is a National Stage Application of PCT/EP2018/054717, filed on Feb. 26, 2018, which claims the benefit of U.S. Patent Application Ser. No. 62/464,061, filed on Feb. 27, 2017, the disclosures of which are incorporated herein by reference in their entireties. To the extent appropriate, a claim of priority is made to each of the above disclosed applications.

TECHNICAL FIELD

The present disclosure relates generally to fiber optic cable fixation devices and related systems and methods.

BACKGROUND

Fiber optic cables contain both optical fibers and strength members. The strength members may be rigid or flexible. Common flexible strength members include string-like reinforcing elements such as aramid yarns. Common rigid strength members can include reinforcing rods which may include glass reinforced polymers.

Optical fibers are often connected to one another via splices. For example, a trunk or main cable may be routed to an area to which service is to be provided and small fiber count "drop cables" may be spliced at the main cable at predetermined spaced apart locations. Splices are often supported within splice enclosures to protect the spliced connection from the environment. The fiber optic cable is typically secured to the enclosure, for instance, by removing the cable outer jacket in order to expose some length of the strength members of the cable. The cable strength members are typically attached (i.e., anchored) to the enclosure so as to provide strain relief.

There is a need for devices and systems for affixing cable strength members of fiber optic cables to structures such as enclosures, panels, trays, or other components. Examples of fiber optic cable fixation systems are found the U.S. Pat. Nos. 5,793,920; 8,903,216; 8,989,550; and 9,465,180 and also in U.S. Patent Application Publication Nos. 2012/0177334 and 2015/0378106.

SUMMARY

One aspect of the present disclosure relates to a fiber optic cable fixation device comprising an elongate fixation component. The elongate fixation component has a length that extends between first and second ends of the elongate fixation component along a first reference axis. The elongate fixation component defines a cable mounting side to which a cable can be attached. The elongate fixation component also includes device stacking sides. The cable mounting side has a width that extends between the device stacking sides. The elongate fixation component further includes a fixation device mount defining a mounting opening that does not extend through the cable mounting side of the elongate fixation component. The mounting opening defines a retainer insertion axis that is offset from the cable mounting side of the elongate fixation component and that extends through the device stacking sides. When a plurality of the elongate fixation components are stacked along the retainer insertion axis, adjacent device stacking sides of adjacently stacked elongate fixation components can oppose and contact one another.

The elongate fixation component can include a cable strength member wrapping location about which a flexible cable strength member can be wrapped. The elongate fixation component can also include a cable tie retainer. The elongate fixation component can further include a glass reinforced polymer strength member anchor. The width of the cable mounting side can be less than or equal to an outer cross-dimension of the largest cable intended to be secured to the fiber optic cable fixation device.

Another aspect of the present disclosure relates to a fiber optic cable fixation device comprising an elongate main body having a length that extends between first and second ends of the elongate main body along a first reference axis. The elongate main body defines a cable mounting side. The device further comprises a cable tie retainer at the first end of the elongate main body. The device also comprises a cable strength member stop at the second end of the elongate main body that projects at least partially in a first direction from the cable mounting side of the elongate main body. The device additionally comprises a fixation device mount at an intermediate location along the length of the elongate main body. The fixation device mount defines a mounting opening that does not extend through the cable mounting side of the elongate main body. The mounting opening defines a retainer insertion axis that is offset in a second direction, which is opposite from the first direction, from the cable mounting side of the elongate main body.

A further aspect of the present disclosure relates to a fiber optic cable mounting system comprising a mounting bracket and a plurality of fiber optic cable fixation devices. The mounting bracket comprises a base; and a first arm and a second arm projecting from the base in the same direction. The first and second arms are spaced apart from each other and face each other. Each of the fiber optic cable fixation devices comprises an elongate main body. The elongate main body has a length that extends between first and second ends of the elongate main body and extends along a first reference axis. The elongate main body defines a cable mounting side. Each device also comprises a cable tie retainer at the first end of the elongate main body. Each device further comprises a cable strength member stop at the second end of the elongate main body. The cable strength member stop projects at least partially in a first direction from the cable mounting side of the elongate main body. Additionally, each device comprises a fixation device mount at an intermediate location along the length of the elongate main body. The fixation device mount defines a mounting opening that does not extend through the cable mounting side of the elongate main body. The mounting opening defines a retainer insertion axis that is offset in a second direction, which is opposite from the first direction, from the cable mounting side of the elongate main body. In accordance with the system, when the devices are mounted on the first and second arms of the mounting bracket, respectively: the first and second arms extend through the mounting openings of the devices along the retainer insertion axis; the cable mounting sides of the devices are aligned along one side of each arm; the cable tie retainers are aligned; the cable strength member stops are aligned; and the devices stack next to each other along the retainer insertion axis.

Another aspect of the present disclosure relates to a fiber optic cable mounting system comprising a plurality of fiber optic cable fixation devices and a circumferential mounting bracket. Each of the fiber optic cable fixation devices comprises an elongate main body. The elongate main body has a length that extends between first and second ends of the elongate main body and that extends along a first reference axis. The elongate main body defines a cable mounting side. Each device also comprises a cable tie retainer at the first end of the elongate main body. Each device further comprises a cable strength member stop at the second end of the elongate main body. The cable strength member stop projects at least partially in a first direction from the cable mounting side of the elongate main body. Additionally, each device comprises a fixation device mount at an intermediate location along the length of the elongate main body. The fixation device mount includes first and second flanges that project in a second direction, which is opposite from the first direction, from the cable mounting side of the elongate main body. The first and second flanges each define a mounting opening that does not extend through the cable mounting side of the elongate main body and the mounting openings define a retainer insertion axis that is offset in the second direction. The circumferential mounting bracket comprises a base having a plurality of sides around the circumference of the base; and a pair of ridges projecting from each side forming a central groove. Each ridge includes a projection extending along the length of the ridge and protruding away from the central groove. The projections of each pair of ridges are configured to engage the mounting openings of the first and second flanges.

Yet another aspect of the present disclosure relates to a fiber optic cable mounting system comprising a plurality of fiber optic cable fixation devices and a mounting plate. Each of the fiber optic cable fixation devices comprises an elongate main body. The elongate main body has a length that extends between first and second ends of the elongate main body and that extends along a first reference axis. The elongate main body defines a cable mounting side. Each device also comprises a cable tie retainer at the first end of the elongate main body. Each device further comprises a cable strength member stop at the second end of the elongate main body. The cable strength member stop projects at least partially in a first direction from the cable mounting side of the elongate main body. Additionally, each device further comprises a fixation device mount at an intermediate location along the length of the elongate main body. The fixation device mount includes first and second flanges that project in a second direction, which is opposite from the first direction, from the cable mounting side of the elongate main body. The first and second flanges each define a mounting opening that does not extend through the cable mounting side of the elongate main body and the mounting openings define a retainer insertion axis that is offset in the second direction. The mounting plate comprises a planar base having a width, a length, and a depth; and pairs of ridges projecting from the planar base. Each pair of ridges forms a central groove. The ridges and grooves extend along the width of the planar base. Each ridge includes a projection extending along the length of the ridge and protruding away from the central groove. The projections of each pair of ridges are configured to engage the mounting openings of the first and second flanges.

The fiber optic cable fixation devices disclosed herein are advantageous because they can be used with various types of fiber optic cables including cables having flexible strength members; cables having relatively rigid strength members; flat cables; round cables; and cables of different sizes. In some examples, fiber optic cables can be attached to the devices prior to mounting the devices to structures (e.g., enclosures, panels, trays, etc.) to which it is desired to anchor the cables. The devices can also be mounted in a variety of compact configurations.

BRIEF DESCRIPTION OF THE DRAWINGS

FIGS. 2A-2F depict a sequence of steps for an example method for affixing a fiber optic cable having flexible strength members to the first embodiment of the device of FIG. 1A.

FIG. 2A is a perspective view showing a partially stripped fiber optic cable attached to the device of FIG. 1A by a cable tie.

FIG. 2B shows a step of wrapping flexible strength members around a wrapping location of the first embodiment of the device of FIG. 1A.

FIG. 2C shows another step of wrapping flexible strength members around a wrapping location of the first embodiment of the device of FIG. 1A.

FIG. 2D shows a step of wrapping flexible strength members across the partially stripped fiber optic cable attached to the device of FIG. 1A.

FIG. 2E shows a step of wedging the flexible strength members between the cable jacket of the partially stripped fiber optic cable and a cable tie retainer of the device of FIG. 1A.

FIG. 2F shows the flexible strength members secured to the cable jacket of the partially stripped fiber optic cable by affixing a cable tie around the device of FIG. 1A.

FIG. 3A shows felt tape wrapped around an unstripped segment of a fiber optic cable having flexible strength members.

FIG. 3B shows a partially stripped cable attached to the first embodiment of the device of FIG. 1A by a cable tie.

FIG. 3C shows a step of wrapping flexible strength members around a wrapping location of the first embodiment of the device of FIG. 1A.

FIG. 3D shows another step of wrapping flexible strength members around a wrapping location of the first embodiment of the device of FIG. 1A.

FIG. 3E shows a step of wrapping flexible strength members across the partially stripped fiber optic cable attached to the device of FIG. 1A.

FIG. 3F shows a step of wedging the flexible strength members between the felt tape and a cable tie retainer of the device of FIG. 1A.

FIG. 3G shows the flexible strength members secured to the felt tape by affixing a cable tie around the device of FIG. 1A.

FIG. 3H shows felt tape wrapped around an up-jacket (e.g., a furcation tube) that protects optical fibers of the cable that would otherwise be exposed after the cable has been prepared for fixation.

FIG. 3I shows a tie wrap attaching the up-jacket to the device of FIG. 1A.

FIG. 3J shows a second tie wrap attaching the up-jacket to the device of FIG. 1A.

FIG. 6A is a perspective view of a first embodiment of a mounting bracket.

FIG. 6B is a side view of the first embodiment of the mounting bracket of FIG. 6A.

FIG. 6C is a front view of the first embodiment of the mounting bracket of FIG. 6A.

FIG. 10 is a perspective view of devices according to the first embodiment of FIG. 1A mounted on a mounting plate.

DETAILED DESCRIPTION

Figure 1A:
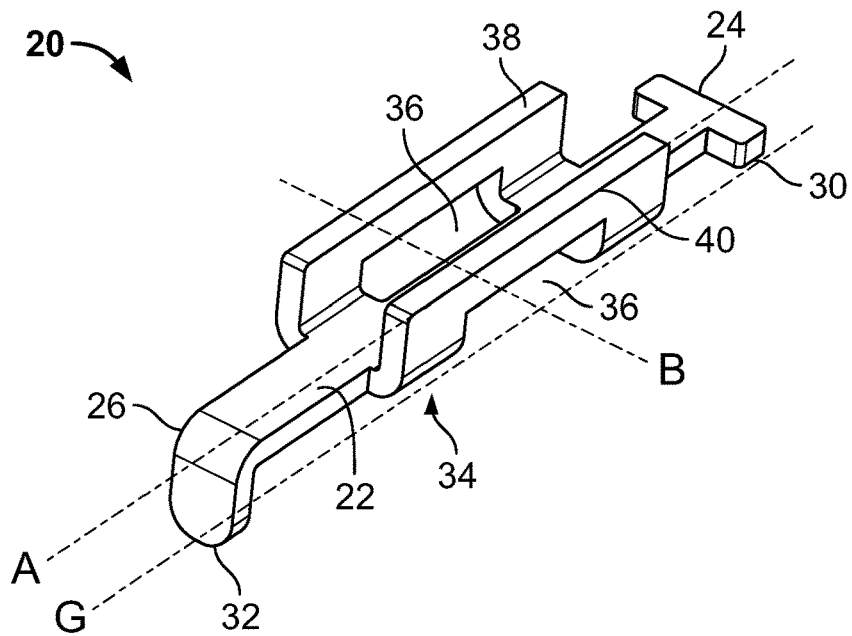
FIG. 1A is a perspective view of a first embodiment of a fiber optic cable fixation device.

Aspects of the present disclosure relate to cable fixation devices that are easy to use and are compact in nature.

Aspects of the present disclosure relate to fixation devices that allow cables to be fixed thereto while the fixation devices are disconnected from structures (e.g., an enclosure, panel, frame, tray, etc.) to which it is desired to anchor the cables, and that can be easily connected to the structures to provide cable anchoring after the cables have been fixed to the fixation devices. In this way, the process of fixing the cables to the fixation devices can take place in an open space free from obstructions and/or limited space corresponding to the structures to which the cables ultimately will be anchored. Additionally, the fixation devices can be mounted to the structures in compact and densely stacked or ganged configurations without concern for providing finger clearance or access between the fixation devices.

Aspects of the present disclosure relate to cable fixation devices that are stackable. In certain examples, the cable fixation devices are configured to be stacked with the cables attached thereto not contributing to a height of the stack. In certain examples, the cable fixation devices are stacked with the cable affixed thereto not being positioned between the stacked fixation devices. In certain examples, the cable fixation devices can be stacked by sliding the cable fixation devices onto an anchoring mount. In certain examples, the cable fixation devices can have mounting openings for slidably receiving an arm of the anchoring mount along an insertion axis that is offset from cable mounting sides of the fixation devices.

Aspects of the present disclosure relate to cable fixation devices that are universal to the extent that such devices can accommodate a variety of different cable sizes and cable types. Different cable types can include cables having different shapes such as round or flat outer transverse cross-sectional profiles. Different cable types also include cables having different types of reinforcing structures such as flexible strength structures (e.g., aramid yarn) that mainly provide tensile reinforcement and more rigid strength structures (e.g., fiber glass reinforced polymer rods) that provide both tensile and compressive reinforcement.

Aspects of the present disclosure relate to a cable fixation device including: an elongate fixation component and/or an elongate main body; and/or an elongate fixation component and/or an elongate main body having a length extending along a first reference axis; and/or first and second ends; and/or a cable mounting side; and/or device stacking sides; and/or a width extending between device stacking sides; and/or a cable tie retainer; and/or a cable strength member stop; and/or a cable strength member stop projecting at least partially in a first direction from the cable mounting side; and/or a fixation device mount; and/or a fixation device mount at an intermediate location; and/or a fixation device mount defining a mounting opening; and/or a fixation device mount defining a mounting opening that does not extend through the cable mounting side; and/or a fixation device mount having a mounting opening defining a retainer insertion axis offset from a cable mounting side of the cable fixation device; and/or a fixation device mount having a mounting opening defining a retainer insertion axis offset from a cable mounting side in a second direction; and/or first and second flanges each defining a mounting opening; and/or first and second flanges projecting in the second direction and each defining a mounting opening; and/or parallel, first and second flanges; and/or a stackable configuration; and/or a stackable configuration along the retainer insertion axis; and/or a stackable configuration where cables are not affixed between the stacked fixation devices; and/or a stackable configuration where the cables do not contribute to a height of the stack; and/or a glass reinforced polymer strength member anchor; and/or a strength member clamp; and/or a strength member clamp configured to mount between the fixation device mount and the second end; and/or a strength member clamp including a collar and a threaded fastener; and/or a T-shaped cable tie retainer; and/or a tab-shaped cable strength member stop; and/or a cable strength member stop bendable to an orientation parallel to the first reference axis; and/or a removable, cable strength member stop; and/or a strength member wrapping location; and/or a cable strength member wrapping location defined between the fixation device mount and the second end; and/or a length; and/or a length extending between first and second ends; and/or a width; and/or a width measured in an orientation that is perpendicular to the first reference axis, the first direction, and the second direction; and/or a width being less than or equal to an outer cross-dimension of the largest cable intended to be secured to the cable fixation device; and/or mounting openings that are slot-shaped; and/or mounting openings extending along the first reference axis; and/or mounting openings aligned along the retainer insertion axis; and/or a configuration adapted to slide on an anchoring mount; and/or a flexible retention latch; and/or a plastic construction; and/or a metal construction; and/or a unitary construction.

In the following detailed description, reference is made to the accompanying drawings showing by way of illustration specific embodiments of devices, systems, and methods. It is to be understood that other embodiments may be utilized and structural or logical changes may be made without departing from the scope of the present disclosure. The following detailed description, therefore, is not to be taken in a limiting sense.

Figure 1B:
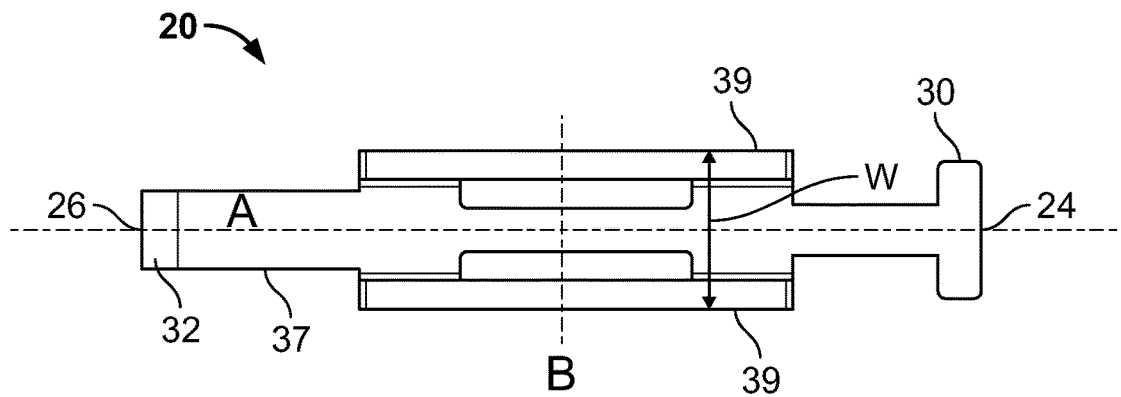
FIG. 1B a top view of the device of FIG. 1A.
Figure 1C:
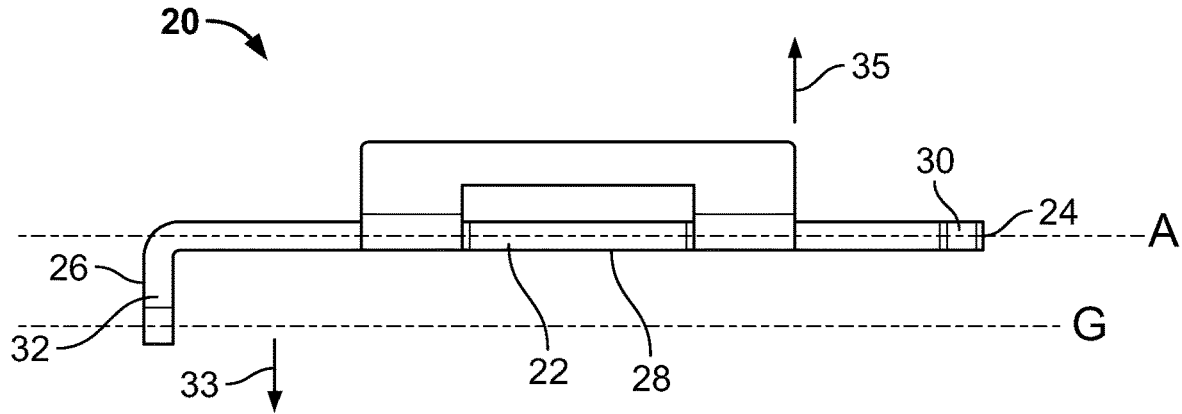
FIG. 1C is a side view of the device of FIG. 1A.

FIGS. 1A-1C show a first embodiment of a fiber optic cable fixation device 20. The device 20 is configured for receiving and retaining a fiber optic cable, which includes optical fibers, strength members, and a cable jacket surrounding the optical fibers and the strength members. The device 20 includes an elongate main body 22 having a first end 24, a second end 26, and a cable mounting side 28. The length of the elongate main body 22 extends along a first reference axis A between the first end 24 and the second end 26.

The device 20 further includes a cable tie retainer 30 at the first end 24 and a cable strength member stop 32 at the second end 26. The cable strength member stop 32 projects at least partially in a first direction 33 (see FIG. 1C) from the cable mounting side 28. In one example, the stop 32 projects in an orientation parallel to the first direction 33.

As shown in FIGS. 1A and 1C, the structure of the device 20 is further illustrated with reference to a second reference axis G. The second reference axis G is parallel to the first reference axis A and offset in the first direction 33 from the first reference axis A. The second reference axis G intersects the cable strength member stop 32, but does not intersect the cable tie retainer 30. When a fiber optic cable is secured to the device 20, the second reference axis G coincides with the location of an axis of the fiber optic cable.

As shown in FIG. 1B, the device 20 has a width W measured in an orientation that is perpendicular to the first reference axis A, the first direction 33, and a second direction 35 (see FIG. 1C) opposite the first direction 33. The width can be less than or equal to an outer cross-dimension of the largest fiber optic cable intended to be secured to the device 20. The width can be less than or equal to about 20 mm, less than or equal to about 15 mm, less than or equal to about 10 mm, less than or equal to about 8 mm, less than or equal to about 5 mm, or less than or equal to about 3 mm. The width can be between about 0.9 mm and about 20 mm, between about 0.9 mm and about 15 mm, between about 0.9 mm and about 10 mm, between about 0.9 mm and about 8 mm, between about 0.9 mm and about 5 mm, between about 0.9 and about 3 mm, between about 3 mm and about 20 mm, between about 3 mm and about 15 mm, between about 3 mm and about 10 mm, between about 3 mm and about 8 mm, between about 3 mm and about 5 mm, between about 5 mm and about 20 mm, between about 5 mm and about 15 mm, between about 5 mm and about 10 mm, or between about 5 mm and about 8 mm. For example, the width can be about 0.9 mm, about 3 mm, about 5 mm, about 8 mm, about 10 mm, about 15 mm, or about 20 mm.

As depicted in FIGS. 1A-1C, the cable tie retainer 30 includes two projections that cooperate with a main part of the elongate main body 22 to form a T-shaped structure. Generally, a cable tie retainer is a structure that prevents a cable tie (e.g., tie wrap) from sliding off a structure about which the cable tie is tied. The cable tie retainer is not limited to the T-shaped structure depicted. The cable tie retainer can be a projection, two projections, or at least one projection. A projection is part that protrudes or juts out from another part. Exemplary projections include tabs, fingers, flanges, lips, bumps, walls, ridges, and rails.

As depicted in FIGS. 1A-1C, the cable strength member stop 32 is a tab. Generally, a cable strength member stop is a structure adapted to oppose or abut an end of a relatively rigid cable strength member (e.g., a rod such as a glass reinforced polymer (GRP) strength member). The cable strength member stop 32 is not limited to the tab depicted. Another example of a cable strength member stop is a surface defined by a projection such as a wall.

The cable strength member stop 32 may be bendable to an orientation parallel to the first reference axis A. Alternatively, the cable strength member stop 32 may be removable from the elongate main body 22. In cables not including rigid strength members, the stop 32 can be re-oriented or removed so as to facilitate attaching up-jacketing to the second end 26 without interference from the stop 32. The up-jacketing can receive and protect optical fibers of the fiber optic cable that would otherwise be exposed after the fiber optic cable has been prepared for fixation. The up-jacketing can protect the optical fibers as the optical fibers are routed from the fixation device to another location (e.g., a splice location, a connectorization location, etc.) defined by the structure (e.g., enclosure, panel, frame, tray, etc.) to which the fixation device is secured/anchored.

The device 20 includes a fixation device mount 34, which is located at an intermediate location along the length of the elongate main body 22 between the first end 24 and the second end 26. The device 20 includes device stacking sides 39 defined by the fixation device mount 34. The portion of the elongate main body 22 between the fixation device mount 34 and the second end 26 forms a cable strength member wrapping location 37. The stop 32 and the fixation device mount 34 form stops at opposite ends of the wrapping location 37.

The fixation device mount 34 has a mounting opening 36. The mounting opening 36 does not extend through the cable mounting side 28 of the elongate main body 22 and defines a retainer insertion axis B. The retainer insertion axis B is offset from the cable mounting side 28 in a second direction 35 (see FIG. 1C) opposite from the first direction 33 (see FIG. 1C).

As shown in FIGS. 1A-1C, the fixation device mount 34 includes a first flange 38 and a second flange 40. The first and second flanges 38, 40 project at least partially in the second direction 35 and, in one example, are parallel and project in an orientation parallel to the second direction 35. Further, each of the first and second flanges 38, 40 defines a mounting opening 36 that is depicted as a slot having a length extending parallel to the first reference axis A. The slots are aligned along the retainer insertion axis B. Other shapes of the mounting opening are also contemplated.

Figure 1D:
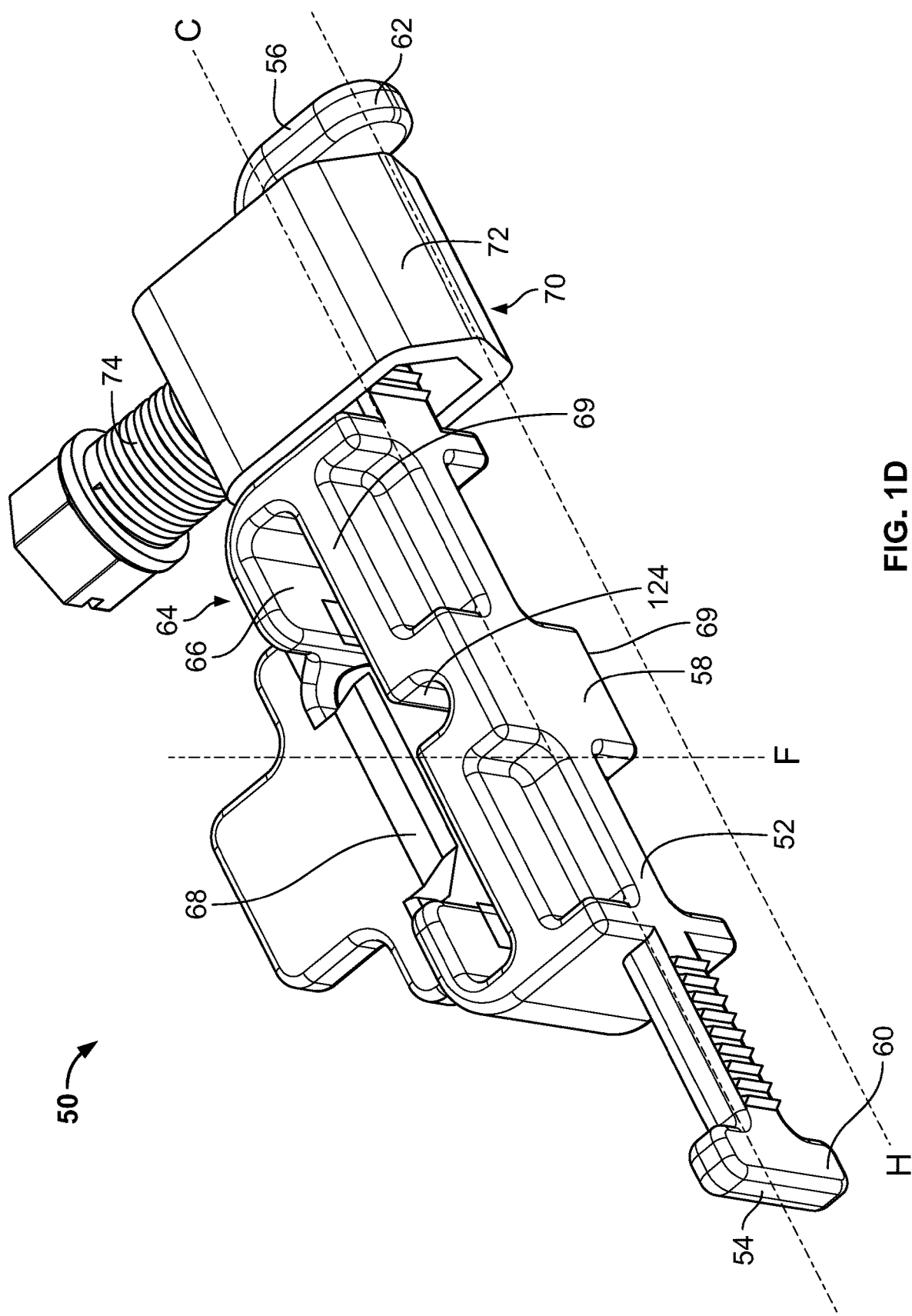
FIG. 1D is a perspective view of a second embodiment of a fiber optic cable fixation device.

FIG. 1D illustrates a second embodiment of a fiber optic cable fixation device 50. The device 50 similarly includes an elongate main body 52 having a first end 54, a second end 56, and a cable mounting side 58. The length of the elongate main body 52 extends along a first reference axis C between the first end 54 and the second end 56. The device 50 also has a cable tie retainer 60 at the first end 54 and a cable strength member stop 62 at the second end 56. The cable strength member stop 62 projects as least partially in a first direction from the cable mounting side 58. As shown in FIG. 1D, the cable tie retainer 60 is T-shaped and the cable strength member stop 62 is a tab.

Also, as shown in FIG. 1D, the structure of the device 50 is further illustrated with reference to a second reference axis H. The second reference axis H is parallel to the first reference axis C and offset in the first direction from the first reference axis C. The second reference axis H intersects the cable strength member stop 62, but does not intersect the cable tie retainer 60. When a fiber optic cable is secured to the device 50, the second reference axis H coincides with the location of an axis of the fiber optic cable.

Additionally, the device 50 has a width measured in an orientation that is perpendicular to the first reference axis C, the first direction, and a second direction opposite the first direction. The width can be less than or equal to an outer cross-dimension of the largest fiber optic cable intended to be secured to the device. The device 50 further includes device stacking sides 69 defined by the fixation device mount 64.

The device 50 differs from the device 20 in the structure of the fixation device mount 64, which is located at an intermediate location along the length of the elongate main body 52 between the first end 54 and the second end 56. Instead of including first and second flanges defining mounting openings, the fixation device mount 64 projects from the elongate main body 52 in the second direction opposite the first direction and opposite the cable strength member stop 62 and the cable mounting side 58. This projection defines a mounting opening 66. The mounting opening 66 does not extend through the cable mounting side 58 of the elongate main body 52 and defines a retainer insertion axis F. The retainer insertion axis F is offset from the cable mounting side 58 in the second direction. The portion of the elongate main body 52 between the fixation device mount 64 and the second end 56 forms a cable strength member wrapping location.

Referring to FIG. 1D, the device 50 also differs from the device 20 in that the fixation device mount 64 further includes a flexible retention latch 68. The device 50 can further include a groove 124 opposite the flexible retention latch 68.

Additionally, the devices 20, 50 can each include a GRP strength member anchor such as a strength member clamp 70 (see FIG. 1D). The strength member clamp 70 is configured to mount between the fixation device mount 34, 64 and the second end 26, 56 of the elongate main body 22, 52. The strength member clamp 70 can include a collar 72 and a threaded fastener 74. Threaded fasteners can include structures such as bolts and screws.

The strength member clamp 70 is a structure adapted to axially fix relatively rigid strength members of a fiber optic cable to the device 20, 50. Clamps include structures that can be tightened to compress a relatively rigid strength member. Clamps can include tightening components such as threaded fasteners, ratchets, crimps, gears, and pawls. Exemplary strength member anchors further include blades and adhesive securement locations. Exemplary blades include edges that cut into the relatively rigid strength member. Exemplary blade configurations suitable for functioning strength member clamps include single blades, opposing blades, and blades defining a v-shape. Adhesive securement locations can include pockets, channels, passages, or other structures in which the relatively rigid strength member can be adhesively secured.

The device 20, 50 may have a unitary construction such that the cable tie retainer 30, 60; the cable strength member stop 32, 62; and the fixation device mount 34, 64 are unitary with the elongate main body 22, 52. The device 20, 50 may be constructed from metal or plastic.

A variety of fiber optic cables can be affixed to a fiber optic cable fixation device as disclosed herein. Fiber optic cables that can be affixed to the device include round cables, flat drop cables, cables with flexible strength members (e.g., aramid yarns), cables with relatively rigid strength members/rods (e.g., glass reinforced polymer (GRP) strength members), and pre-connectorized cables.

It is particularly advantageous that the fiber optic cable fixation device accommodates different fiber optic cable types and both flexible strength members and relatively rigid strength members. For convenience and illustration, the following discussion references device 20 when describing sequences of steps for attaching fiber optic cable to the fiber optic cable fixation device. However, the methods described herein are not limited to the specific embodiment of the device 20.

Figure 2C:
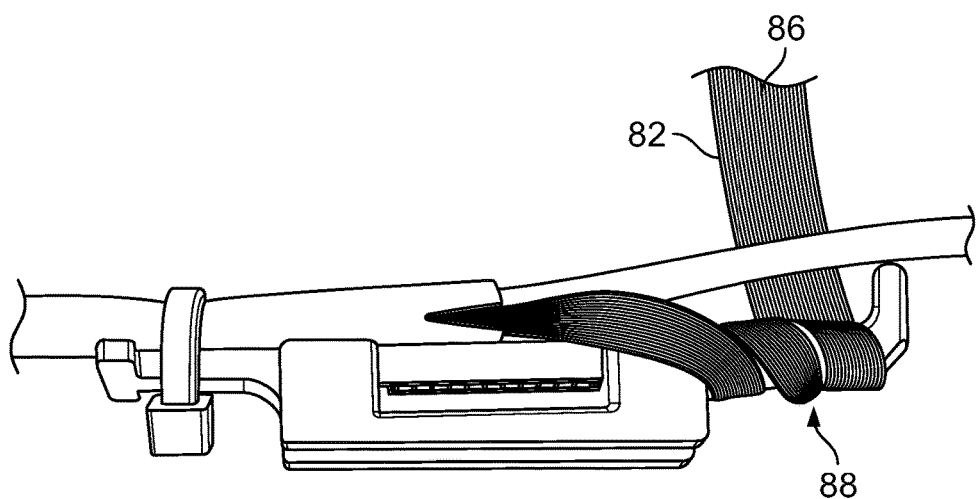
Figure 2D:
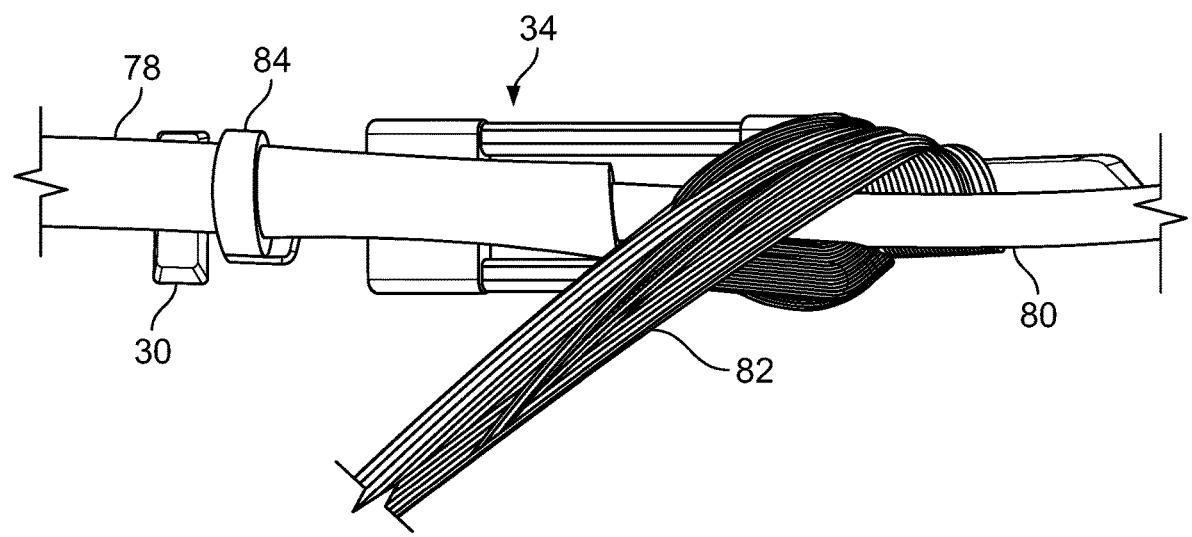
Figure 2E:
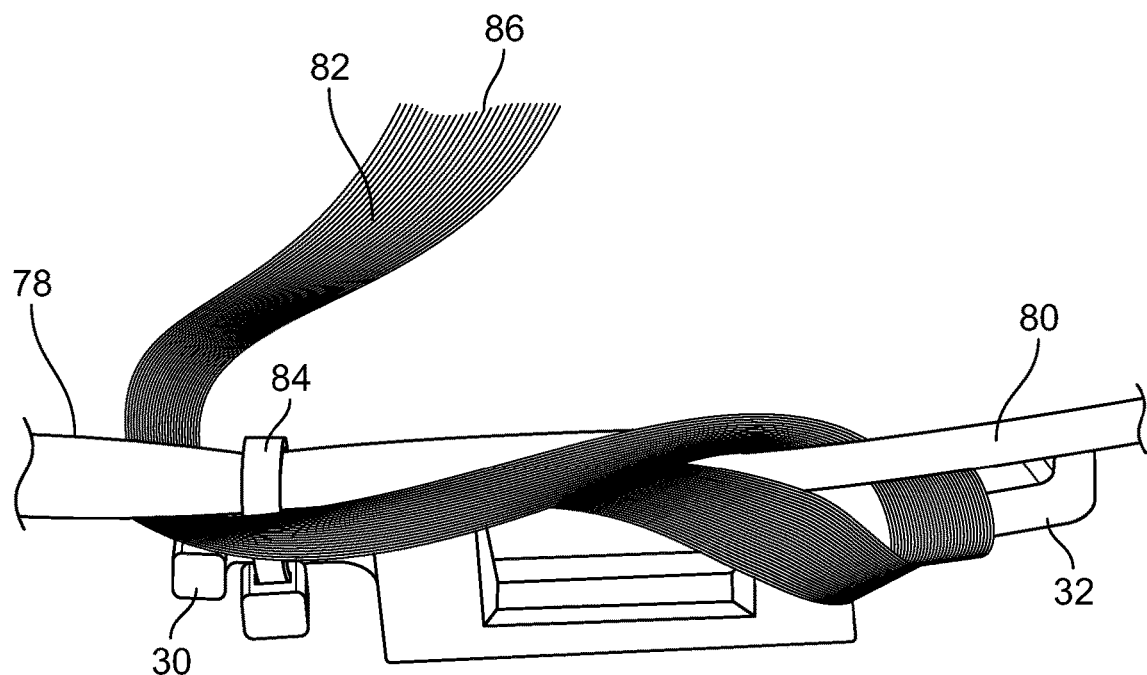
Figure 2F:
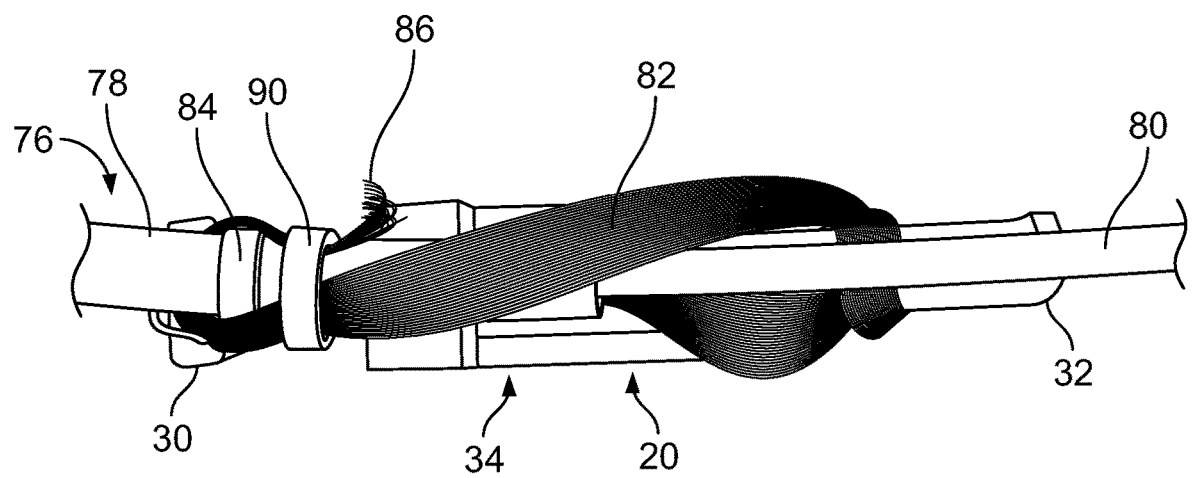

FIG. 2F depicts a fiber optic cable 76 affixed to the device 20 with flexible strength members 82 (e.g., aramid fibers) wound around and secured to the device 20. FIGS. 2A-2F depict affixing the fiber optic cable 76 having flexible strength members 82 to the device 20.

As illustrated in FIG. 2A, a cable jacket 78 is stripped from a portion of a cable 76 to expose flexible strength members 82 and a buffer tube 80 containing one or more optical fibers. The cable 76 is then placed on the cable mounting side 28 of the device 20 and a tie wrap 84 is used to affix the unstripped portion of the cable 76 to the device 20 between the cable tie retainer 30 and the fixation device mount 34. In particular, the tie wrap 84 is secured around the cable jacket 78 adjacent to the cable tie retainer 30.

Next, as shown in FIG. 2B, the flexible strength members 82 are wound at a cable strength member wrapping location 88 between the fixation device mount 34 and the cable strength member stop 32. The flexible strength members 82 are wound around the side of the elongate main body 22 opposite the cable mounting side 28 and against the fixation device mount 34. The free end 86 of the flexible strength members 82 is pulled in the first direction to tighten the flexible strength members 82 against the elongate main body 22.

As shown in FIG. 2C, the flexible strength members 82 are wound around the cable strength member wrapping location 88 at least one more time and then the free end 86 is pulled in the first direction to tighten the flexible strength members 82 around the cable strength member wrapping location 88.

Next, as depicted in FIG. 2D, the flexible strength members 82 are wound over the buffer tube 80 and diagonal across approximately the mid-point of the fixation device mount 34. At this point, referring to FIG. 2E, the free end 86 is pulled directly towards the cable tie retainer 30 and the flexible strength members 82 are passed between the cable jacket 78 and the cable tie retainer 30. This wedges the flexible strength members 82 between the cable mounting side 28 of the elongate main body 22 and the cable jacket 78.

Subsequently, as shown in FIG. 2F, a tie wrap 90 is used to affix the flexible strength members 82 to the cable jacket 78. The tie wrap 90 is placed over the cable jacket 78 and flexible strength members 82 between the previously secured tie wrap 84 and the fixation device mount 34. The flexible strength members 82 are then cut so that the free end 86 only extends a short distance beyond the tie wrap 90.

Figure 3A:
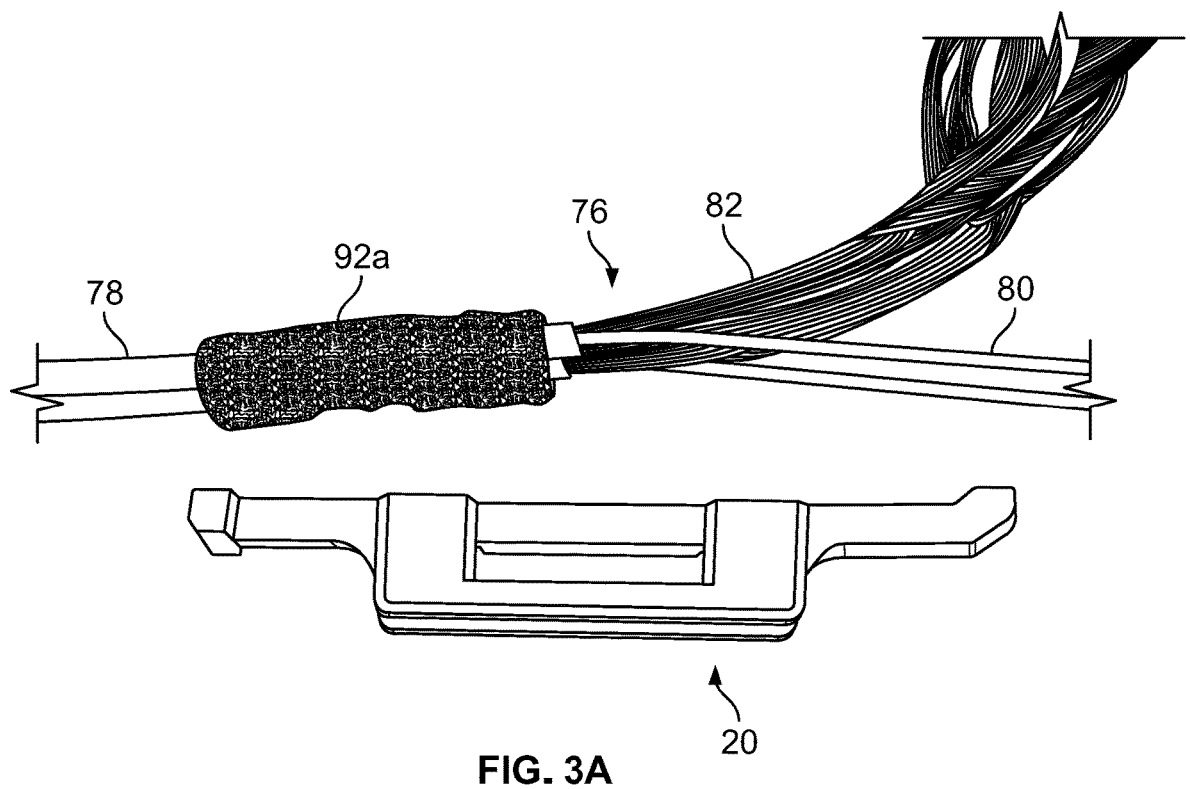
FIGS. 3A-3J depict a sequence of steps for another example method for affixing a fiber optic cable having flexible strength members to the first embodiment of the device of FIG. 1A.
Figure 3B:
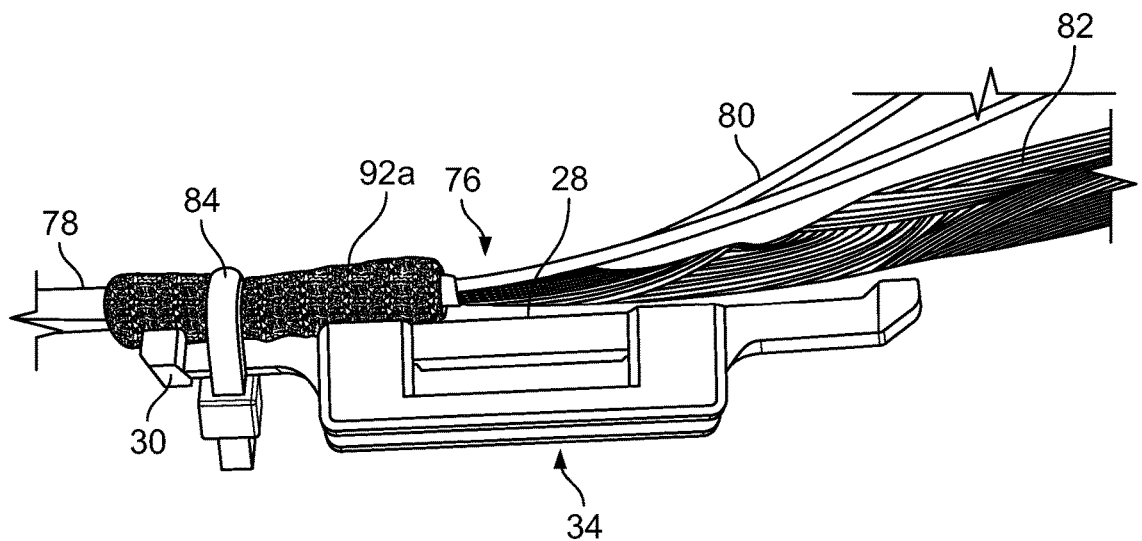
Figure 3C:
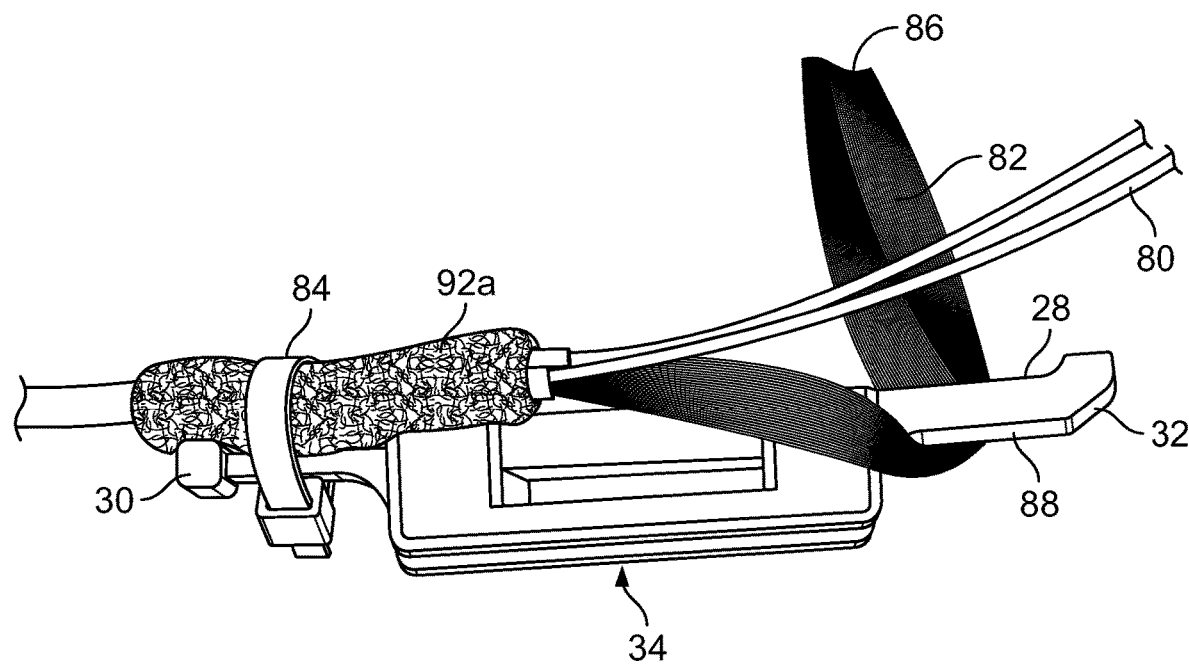
Figure 3D:
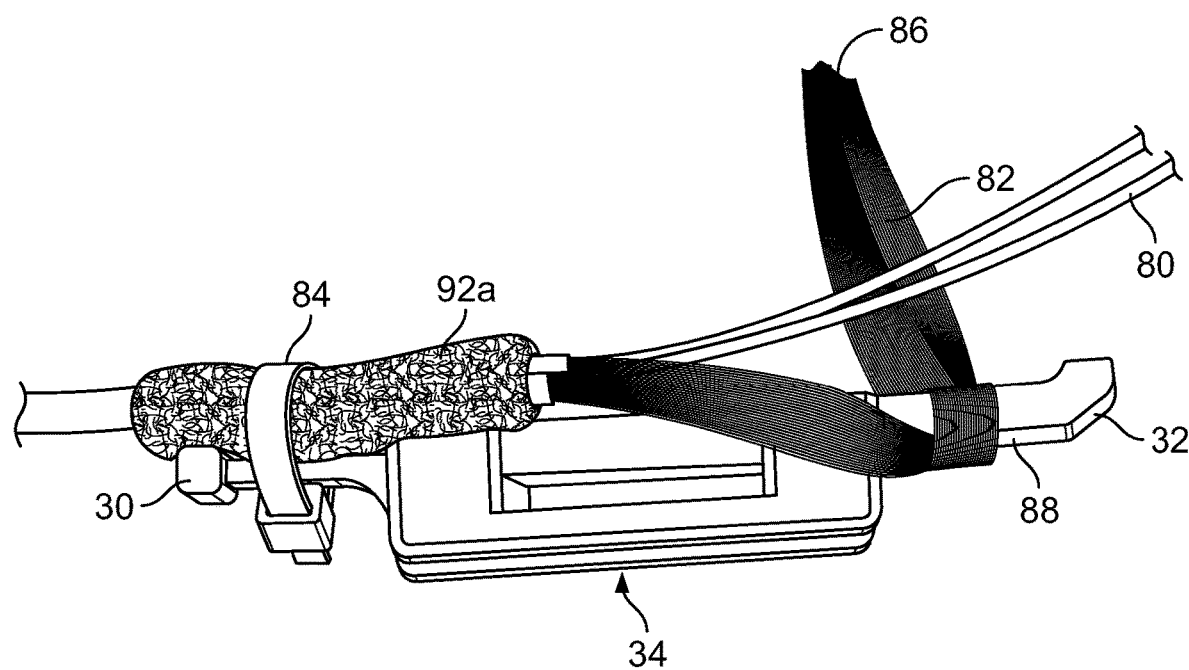
Figure 3E:
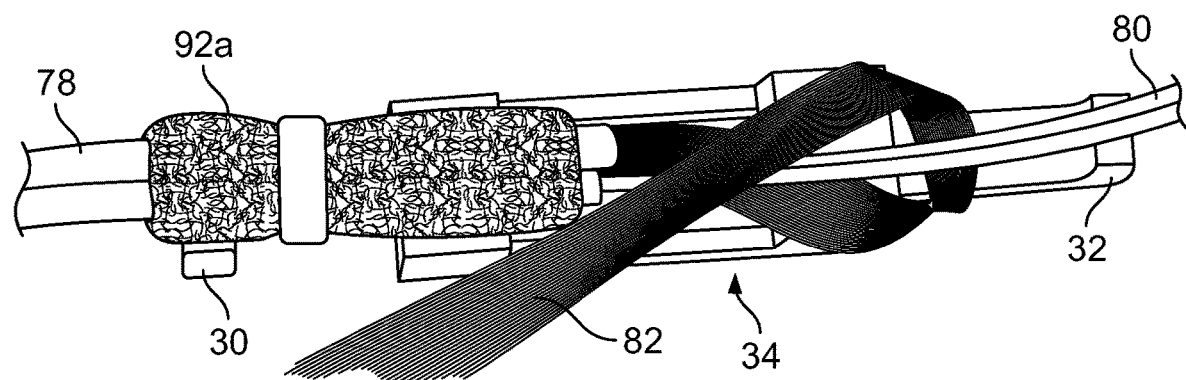
Figure 3F:
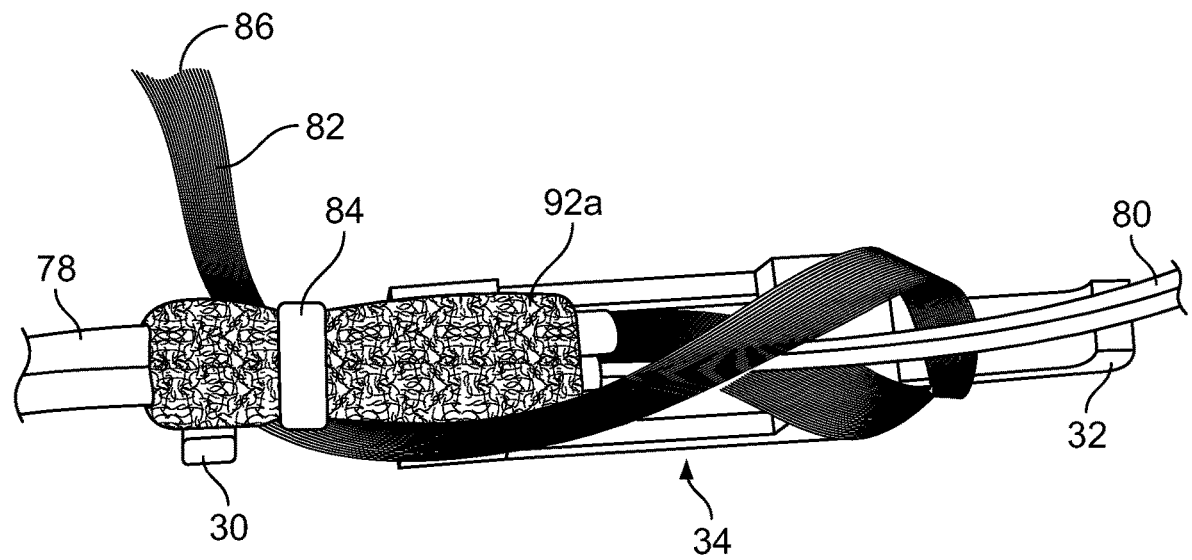
Figure 3G:
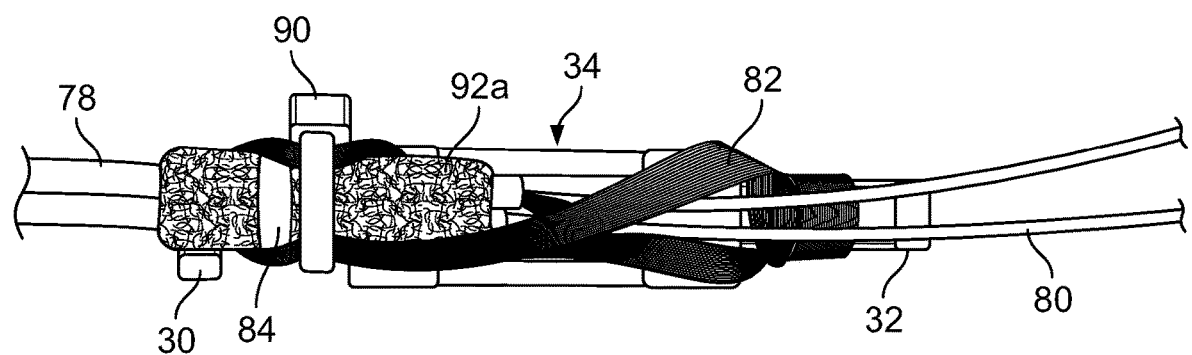
Figure 3H:
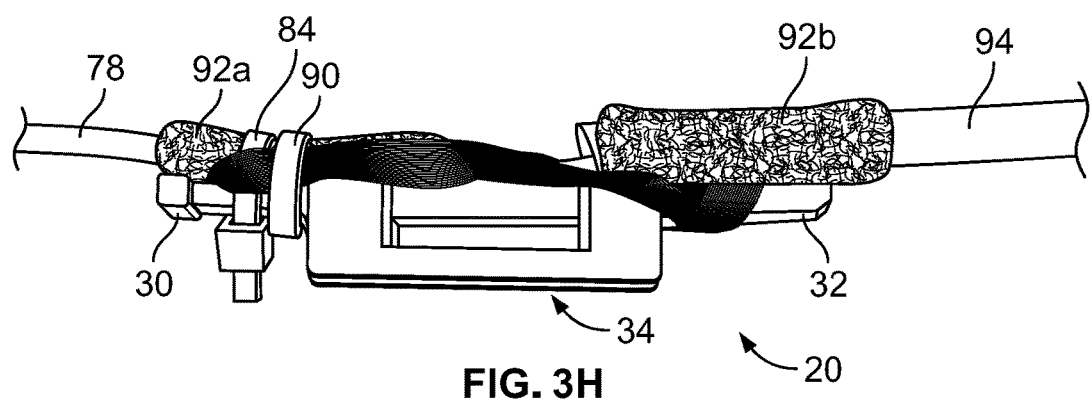
Figure 3I:
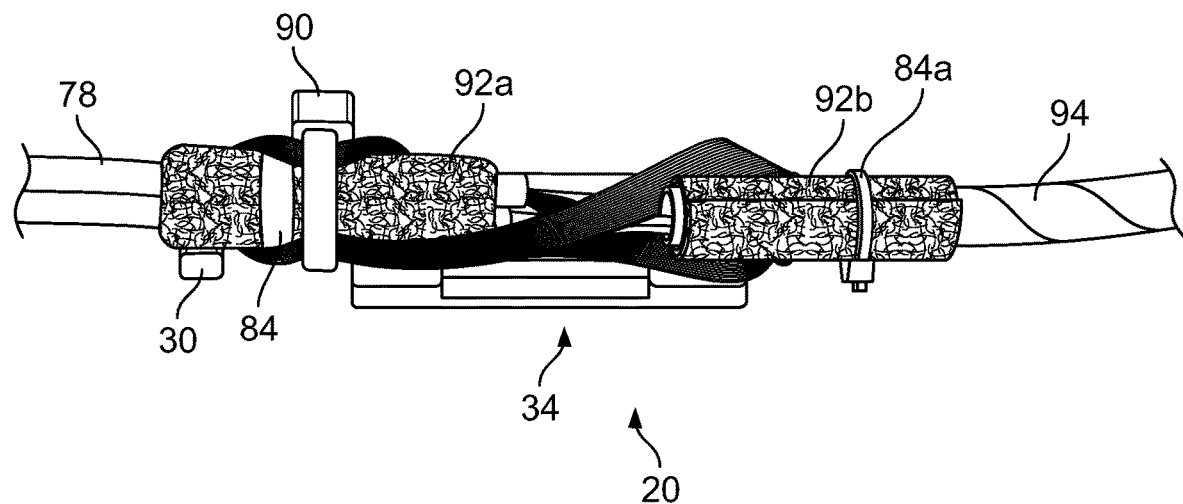
Figure 3J:
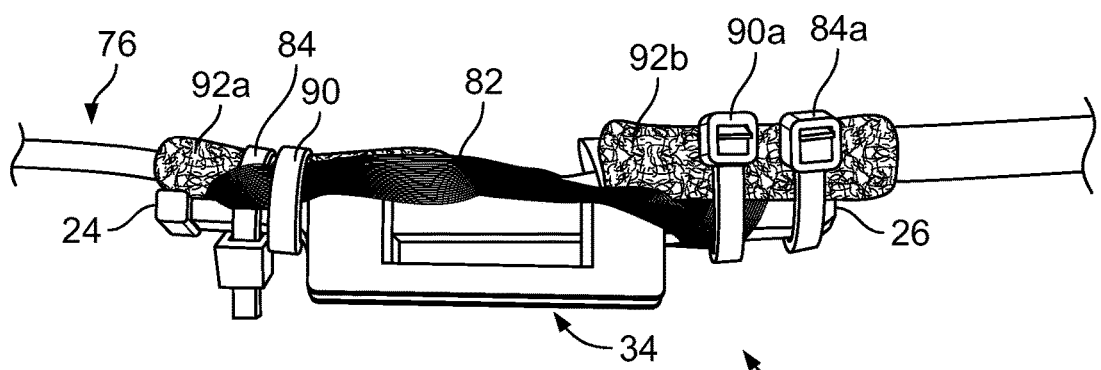

FIG. 3J depicts fiber optic cables 76 having flexible strength members 82 wound around and secured to the device 20 with the use of felt tape 92*a*, 92*b*. FIGS. 3A-3J depict affixing the fiber optic cables 76 having flexible strength members 82 to the device 20 with the use of felt tape 92*a*, 92*b*.

As illustrated in FIG. 3A, cable jackets 78 are stripped from portions of cables 76 to expose tight buffered optical fibers 80 and flexible strength members 82. Felt tape 92*a* is wrapped around cable jackets 78 on the unstripped portion of the cables 76.

Referring to FIG. 3B, the cables 76 are then placed on the cable mounting side 28 of the device 20 and a tie wrap 84 is used to affix the unstripped portion of the cables 76 to the device 20 between the cable tie retainer 30 and the fixation device mount 34. In particular, the tie wrap 84 is secured around the cable jackets 78 adjacent to the cable tie retainer 30.

Next, as shown in FIG. 3C, the flexible strength members 82 are wound at a cable strength member wrapping location 88 between the fixation device mount 34 and the cable strength member stop 32. In particular, the flexible strength members 82 are wound around the side of the elongate main body 22 opposite the cable mounting side 28 and against the fixation device mount 34 and the free end 86 of the flexible strength members 82 is pulled in the first direction to tighten the flexible strength members 82 against the elongate main body 22.

As shown in FIG. 3D, the flexible strength members 82 are wound around the cable strength member wrapping location 88 at least one more time and then the free end 86 is pulled in the first direction to tighten the flexible strength members 82 around the cable strength member wrapping location 88.

Next, as depicted in FIG. 3E, the flexible strength members 82 are wound over the optical fibers 80 and diagonal across approximately the mid-point of the fixation device mount 34. At this point, referring to FIG. 3F, the free end 86 is pulled directly towards the cable tie retainer 30 and the flexible strength members 82 are passed between the felt tape 92a and the cable tie retainer 30. This wedges the flexible strength members 82 between the cable mounting side 28 of the elongate main body 22 and the felt tape 92a.

Subsequently, as shown in FIG. 3G, a tie wrap 90 is used to affix the flexible strength members 82 over the felt tape 92a. The tie wrap 90 is placed over the felt tape 92a and flexible strength members 82 between the previously secured tie wrap 84 and the fixation device mount 34. The flexible strength members 82 are then cut so that the free end 86 only extends a short distance beyond the tie wrap 90.

Thereafter, referring to FIG. 3H, the optical fibers 80 are inserted through a protective jacket 94 (e.g., up-jacketing such as a length of furcation tube) and felt tape 92b is wrapped around the protective jackets 94. The felt tape 92b is wrapped around the protective jacket 94 at the end of the protective jacket 94 closest to the device 20. A tie wrap 84a secures the jacketed, felt wrapped optical fibers 80 to the elongate main body 22 between the second end 26 and the fixation device mount 34 as shown in FIG. 3I. Another tie wrap 90a can then secure the jacketed felt wrapped optical fibers 80 to the elongate main body 22 between the tie wrap 84a and the fixation device mount 34 as shown in FIG. 3J. The stop 32 can optionally be displaced or removed to prevent interference with the jacket 94.

Figure 4:
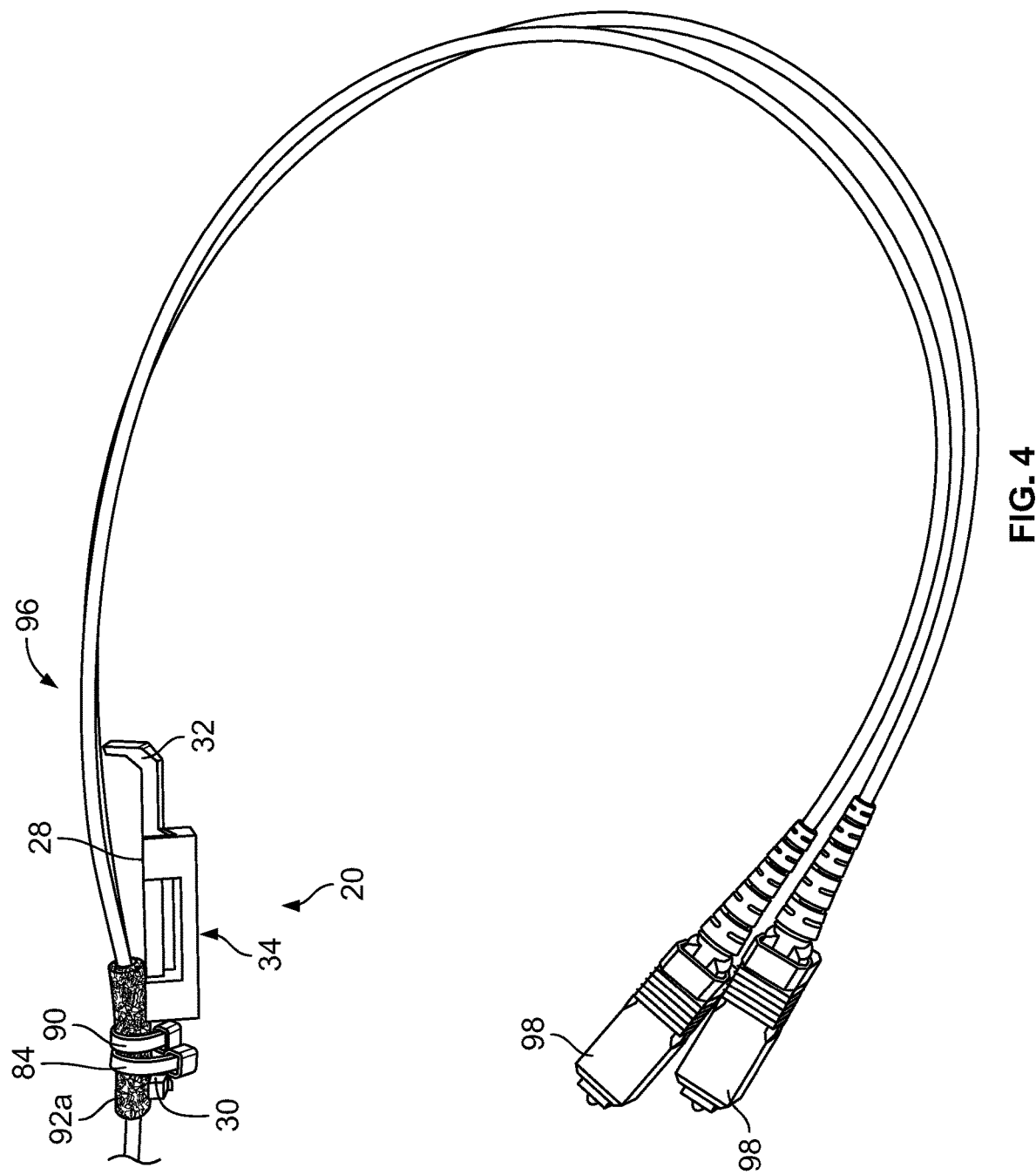
FIG. 4 shows a pre-connectorized fiber optic cable attached to the first embodiment of the device of FIG. 1A.

Pre-connectorized fiber optic cables may also be used with a fiber optic cable fixation device as disclosed herein. FIG. 4 shows a cable with a pre-connectorized fiber optic cable arrangement attached to the device 20. It is a very simple process to attach the pre-connectorized fiber optic cable.

The pre-connectorized fiber optic cable arrangement 96 is placed on the cable mounting side 28 of the device 20 with the pre-connectorized ends 98 in the direction of the cable strength member stop 32. Felt tape 92a is then wrapped around the pre-connectorized cable arrangement 96. A tie wrap 84 is used to affix the felt tape wrapped portion of the cable arrangement 96 to the device 20 between the cable tie retainer 30 and the fixation device mount 34. Another tie wrap 90 can be used to more securely affix the felt tape wrapped portion of the cable arrangement 96 to the device 20 between the cable tie retainer 30 and the fixation device mount 34.

Figure 5:
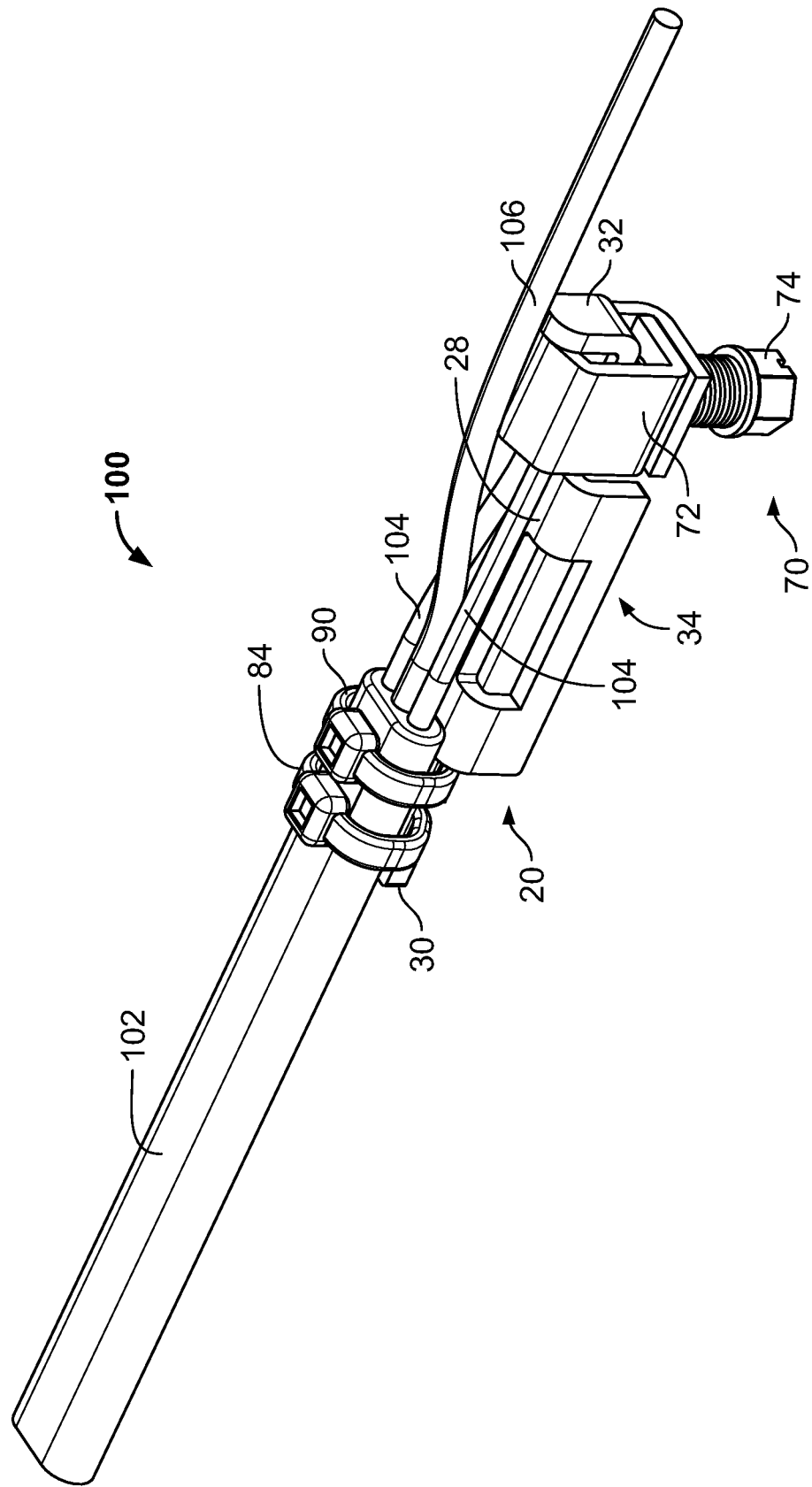
FIG. 5 shows a flat drop fiber optic cable having relatively rigid strength members attached to the first embodiment of the device of FIG. 1A.

FIG. 5 illustrates attachment of a flat drop fiber optic cable 100 to the fiber optic cable fixation device 20. A cable jacket 102 is stripped from a portion of the cable 100 to expose relatively rigid strength members 104 and a buffer tube 106 containing one or more optical fibers. The cable 100 is then placed on the cable mounting side 28 of the device 20 with the stripped portion of the cable in the direction of the cable strength member stop 32. A tie wrap 84 is used to affix the unstripped portion of the cable 100 to the device 20 between the cable tie retainer 30 and the fixation device mount 34. Another tie wrap 90 can be used to more securely affix the unstripped portion of the cable 100 to the device 20 between the cable tie retainer 30 and the fixation device mount 34.

The relatively rigid strength members 104 are extended along the first reference axis A along the length of the elongate main body 22 and cut near the cable strength member stop 32. A strength member clamp 70 (e.g., a collar 72 and a threaded fastener 74) is used to secure the relatively rigid strength members 104 to the elongate main body 22 between the fixation device mount 34 and the cable strength member stop 32.

The fiber optic cable fixation device disclosed herein is also advantageous because a fiber optic cable can be affixed to the device prior to installing the device in a particular configuration (e.g., installing the device into a splice enclosure). The following discussion is directed to mounting systems for a plurality of fiber optic cable fixation devices having fiber optic cables affixed thereto.

FIGS. 6A-6C depict a mounting bracket 110 configured to receive a plurality of devices 20 in a stacked arrangement. The mounting bracket 110 includes a base 112 with first and second arms 114a, 114b (e.g., rails, slide mounts, extensions, projections, etc.) projecting from the base 112 in the same direction. The first and second arms 114a, 114b are spaced apart from each other and face each other. The mounting bracket 110 has a plurality of through-holes 126 in the base 112 useful for securing the mounting bracket 110 to an enclosure (e.g., a splice enclosure) or other structure with fasteners such as bolts, screws, rivets, or snap-fit connections.

Figure 7A:
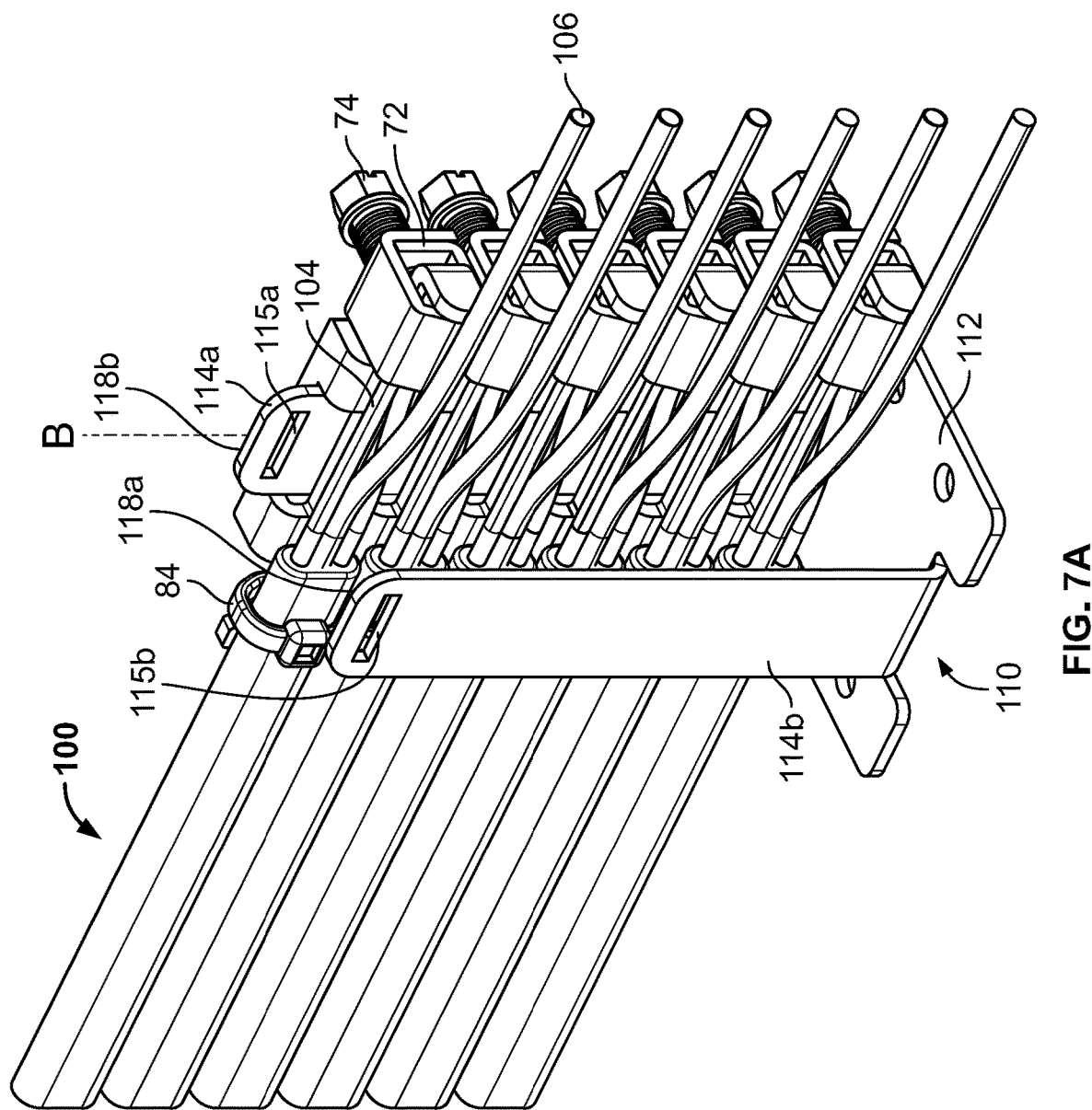
FIG. 7A is a perspective view depicting devices according to the first embodiment of FIG. 1A mounted on the first embodiment of the mounting bracket of FIG. 6A.

FIG. 7A shows a system including a plurality of devices 20 and the mounting bracket 110. FIG. 7A depicts a plurality of flat drop fiber optic cables 100 having relatively rigid strength members 104 attached to the plurality of devices 20 as discussed above with reference to FIG. 5. However, the system disclosed herein is not limited to use with flat drop fiber optic cables 100 having relatively rigid strength members 104 as a variety of fiber optic cables can be affixed to the fiber optic cable fixation device.

When the devices 20 are mounted on an arm 114a, 114b of the mounting bracket 110, the arm 114a, 114b extends through the mounting openings 36 along the retainer insertion axis B. The cable mounting sides 28 of the elongate main bodies 22 are aligned along one side of the arm 114a, 114b, the cable tie retainers 30 are aligned, and the cable strength member stops 32 are aligned, and the devices 20 stack next to each other along the retainer insertion axis B. The stacking arrangement on the mounting bracket 110 is very compact and space efficient.

Figure 8:
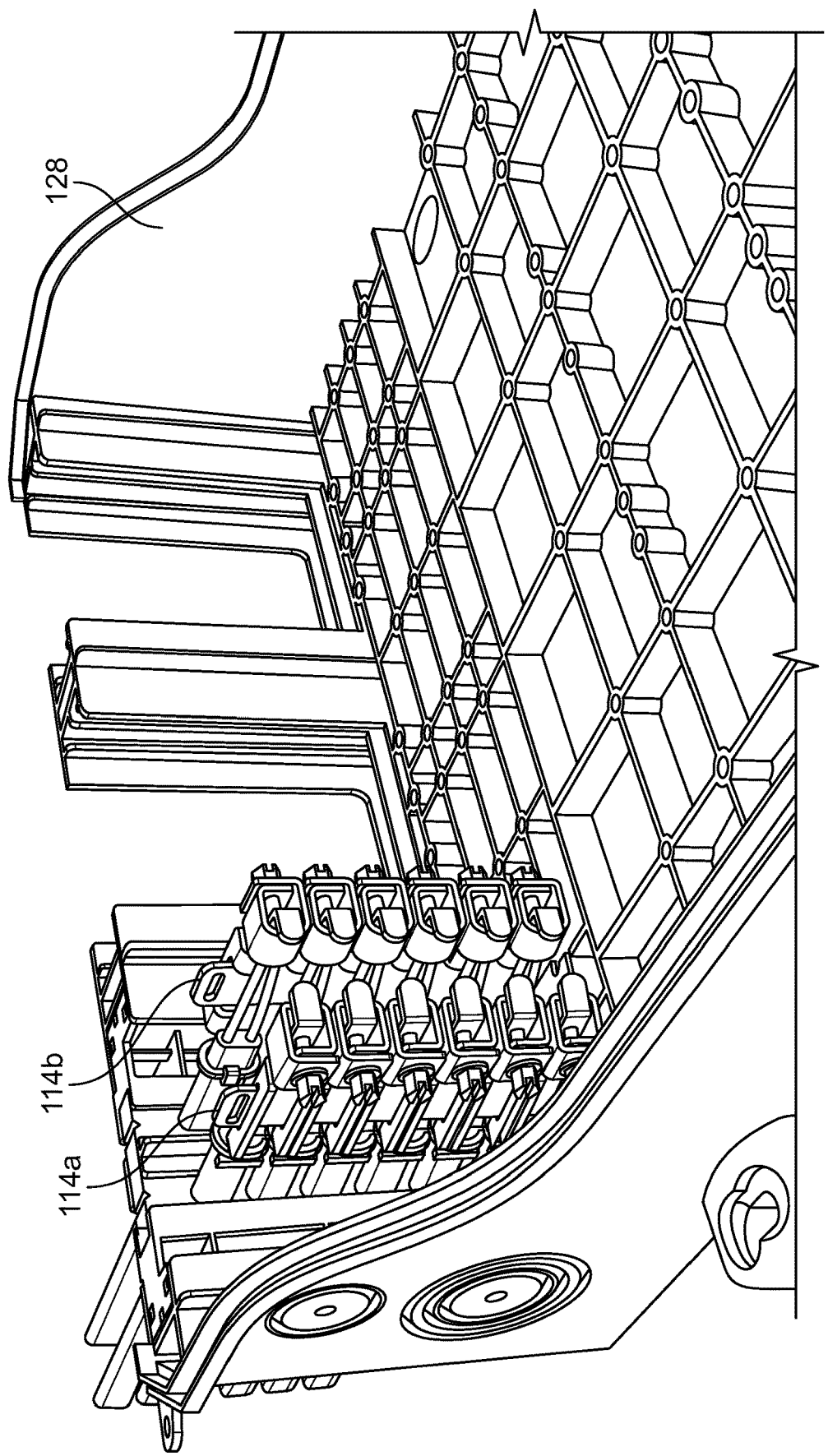
FIG. 8 shows a system including devices according to the first embodiment of FIG. 1A and a first embodiment of the mounting bracket of FIG. 7A mounted in a splice enclosure.

The compactness of the stacking arrangement is apparent from FIG. 8. FIG. 8 shows a system of devices 20 stacked on first and second arms 114a, 114b of the mounting bracket 110 where the mounting bracket 110 is mounted in a splice enclosure 128.

Referring back to FIG. 7A, an aperture 115a, 115b can traverse each arm 114a, 114b near the end 118a, 118b of the arm 114a, 114b. The apertures 115a, 115b permit fastening of a tie wrap around or between the apertures 115a, 115b to prevent the fiber optic cable fixation devices 20 from sliding off the arms 114a, 114b. The tie wrap can be secured onto the mounting bracket 110 through the apertures 115a, 115b in a conventional manner or, alternatively, the tie wrap can extend through the apertures 115a, 115b and then double back on itself through the apertures 115a, 115b and be secured to itself.

Figure 7B:
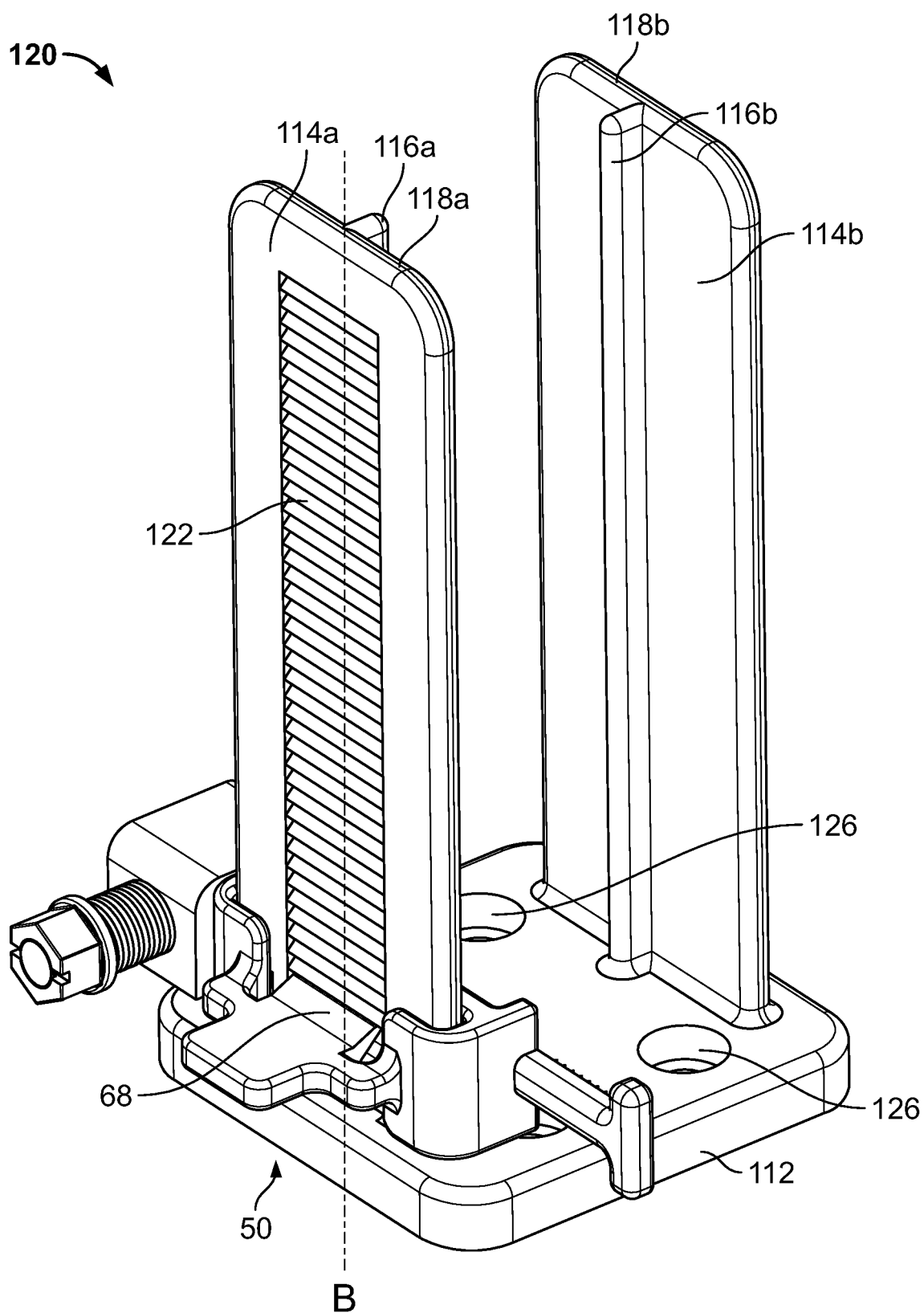
FIG. 7B is a perspective view showing a device according to the second embodiment of FIG. 1D mounted on a second embodiment of a mounting bracket.

FIG. 7B depicts an alternative embodiment of a mounting bracket 120 for use with the fiber optic cable fixation device 50. Like the mounting bracket 110, the mounting bracket 120 includes a base 112 with first and second arms 114a, 114b projecting from the base 112 in the same direction. The first and second arms 114a, 114b are spaced apart from each other and face each other. The mounting bracket 120 has a plurality of through-holes 126 in the base useful for securing the mounting bracket 120 to an enclosure (e.g., a splice enclosure) or other structure via fasteners.

The mounting bracket 120 further includes a plurality of teeth 122 placed along the length of the arms 114a, 114b between the base 112 and the ends 118a, 118b of the arms 114a, 114b. The teeth 122 are located on the non-facing sides of the arms 114a, 114b opposite from the facing sides of the arms 114a, 114b. The mounting bracket 120 can further include ridges 116a, 116b extending along the entire length of the arms 114a, 114b from the base 112 to the ends 118a, 118b of the arms 114a, 114b. The ridges 116a, 116b are located on the facing sides of the arms 114a, 114b.

A plurality of devices 50 can be mounted on the mounting bracket 120. FIG. 7B illustrates how a device 50 slides onto an arm 114a, 114b of the mounting bracket 120 and engages the arm 114a, 114b of the mounting bracket 120. When a device is mounted on an arm 114a, 114b of the mounting bracket 120, the arm 114a, 114b extends through the mounting opening 66 along the retainer insertion axis B. The teeth 122 engage the flexible retention latch 68. The ridges 116a, 116b engage the groove 124 in the fixation device mount 64 opposing the flexible retention latch 68.

When a plurality of devices 50 are mounted on an arm 114a, 114b of the mounting bracket 120, the cable mounting sides 58 of the elongate main bodies 52 are aligned, the cable tie retainers 60 are aligned, the cable strength member stops 62 are aligned, and the devices 50 stack next to each other along the retainer insertion axis B. Like the stacking arrangement on the mounting bracket 110, the stacking arrangement on the mounting bracket 120 is very compact and space efficient.

Figure 9A:
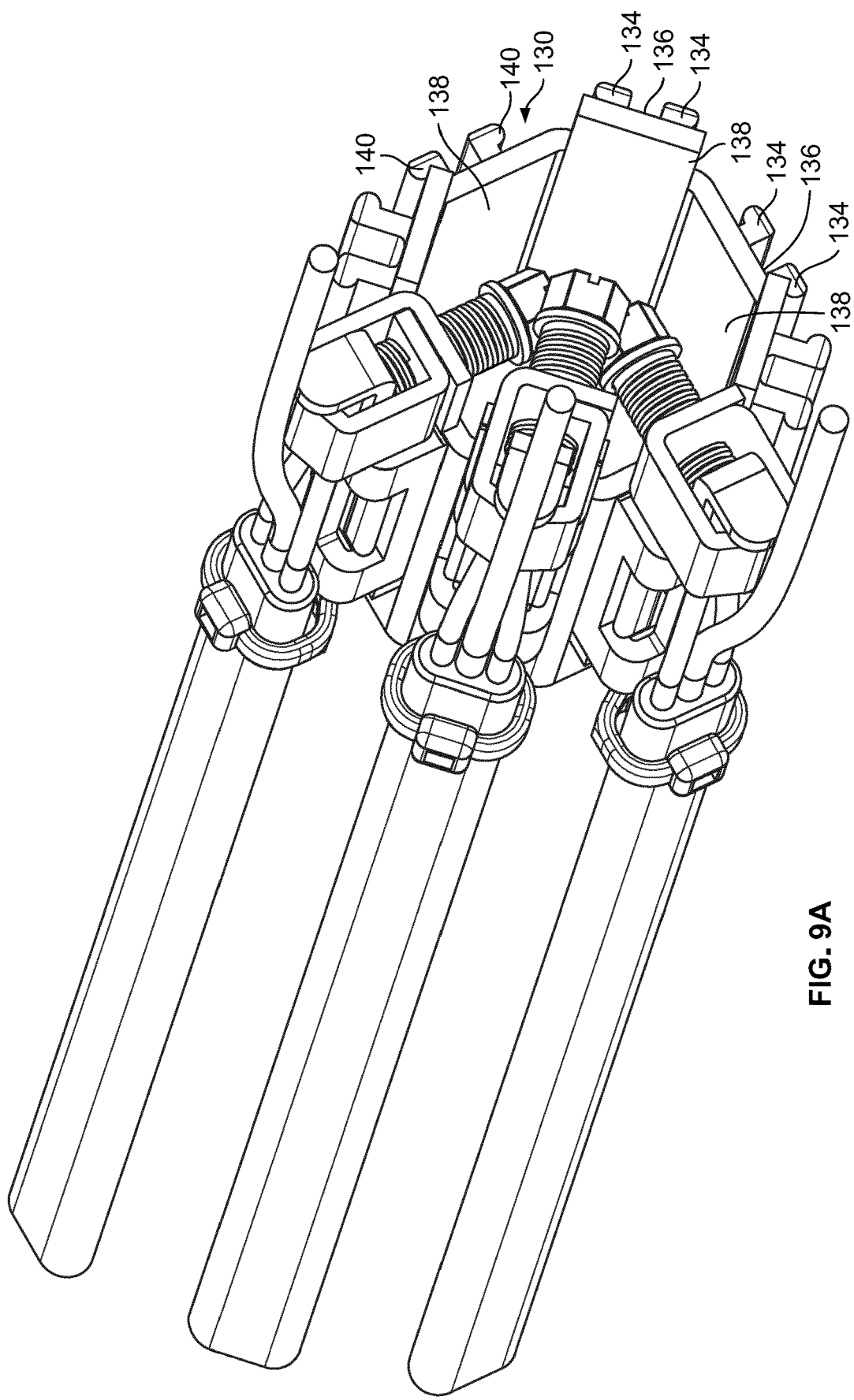
FIG. 9A is a perspective view of devices according to the first embodiment of FIG. 1A mounted on a circumferential mounting bracket.
Figure 9B:
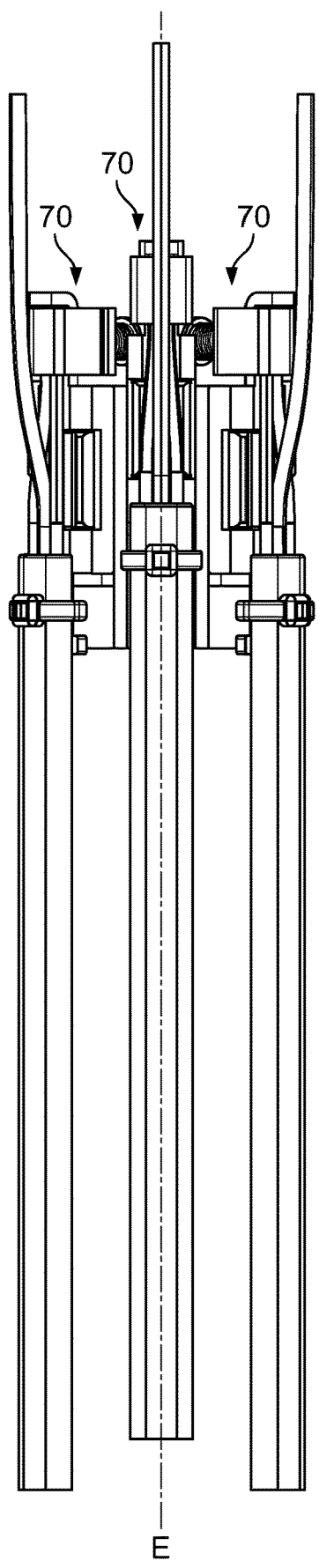
FIG. 9B is a side view of devices according to the first embodiment of FIG. 1A mounted on the circumferential mounting bracket of FIG. 9A.
Figure 9C:
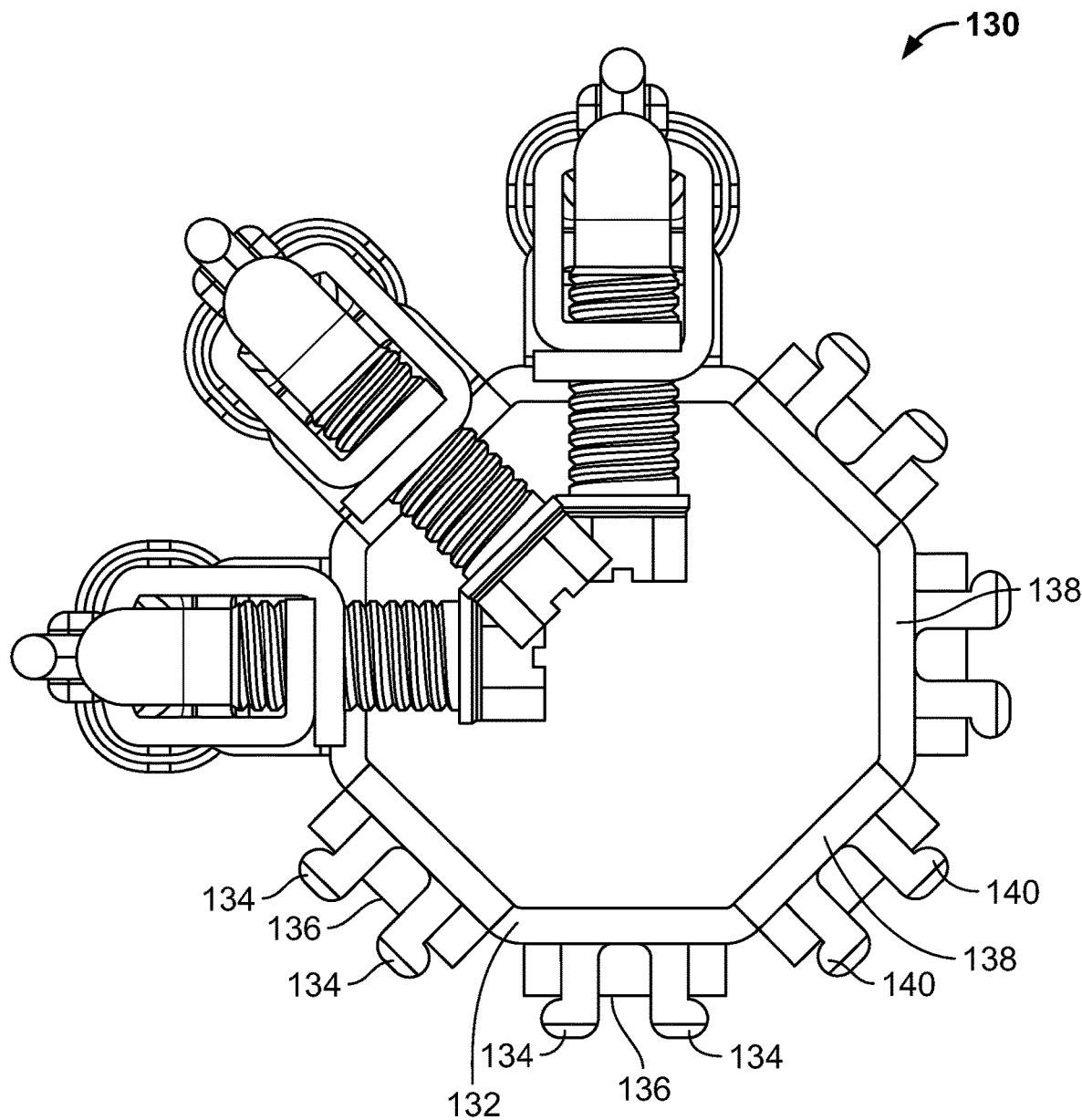
FIG. 9C is an end view of devices according to the first embodiment of FIG. 1A mounted on the circumferential mounting bracket of FIG. 9A.

FIGS. 9A-9C show a plurality of devices 20 mounted on a circumferential mounting bracket 130. The circumferential mounting bracket 130 includes a base 132 having a shape with a plurality of sides 138 around the circumference of the base 132. As illustrated in FIGS. 9A-9C, the bracket 130 includes eight (8) sides 138 and is octagonal in shape. However, the bracket 130 may instead have an alternative geometric shape (e.g., triangular with three (3) sides, square or rectangular with four (4) sides, pentagonal with five (5) sides, hexagonal with six (6) sides, heptagonal with seven (7) sides, etc.). Each side has a pair of ridges 134 projecting from each side 138 forming a central groove 136. The length of the ridges 134 and the grooves 138 are approximately equivalent to the length of the mounting openings 36 along the first reference axis A. Each ridge 134 includes a projection 140 extending along the length of the ridge 134 and protruding away from the associated central groove 138. The projections 140 are configured to engage the mounting openings 36 and affix the devices 20 to the bracket 130. The ridges 134, projections 140, and associated central groove 136 of each side 138 can be offset from the neighboring ridges 134, projections 140, and associated central groove 136 along a central axis E as shown in FIG. 9B. Such an offset configuration permits strength member clamps 70 to be offset from neighboring strength member clamps 70 along the central axis E (when the use of strength member clamps 70 is desired).

When a plurality of devices 20 are mounted on the bracket 130, the mounting openings 36 of each device 20 engage the projections 140 of the ridges 134 of a side 138 with the cable mounting side 28 of each device facing outward. When mounted, the devices 20 are secured around the circumference of the bracket 130 with the cable tie retainers on one side of the bracket 130 and the cable strength member stops on the other side of the bracket 130.

FIG. 10 shows a plurality of devices 20 secured to a mounting plate 150. The mounting plate 150 includes a planar base 152 having a width W, a length L, and a depth D. Pairs of ridges 154 project from the planar base 152 with each pair of ridges 154 forming a central groove 156. The ridges 154 and grooves 156 extend along the width W of the planar base 152. The length of the ridges 154 and the grooves 156 are approximately equivalent to the length of the mounting openings 36 along the first reference axis A. Each ridge 154 includes projections 160 extending along the length of the ridge 154 and protruding away from the associated central groove 156. The projections 160 are configured to engage the mounting openings 36 and affix the devices 20 to the mounting plate 150. The ridges 154, projections 160, and grooves 156 are aligned along the length L of the planar base 152.

When a plurality of devices 20 are mounted on the mounting plate 150, the mounting openings 36 of each device 20 engage the projections 160 of a pair of ridges 154 with the cable mounting side 28 of each device facing away from a face of the planar base 152 defined by the length L and the width W. When mounted, the devices 20 are secured to the face of the planar base 152 defined by the length L and the width W with the cable tie retainers aligned on one side of the mounting plate 150 defined by the length L and the depth D and the cable strength member stops aligned on the opposing side of the mounting plate defined by the length L and the depth D.

As used herein, the term glass reinforced polymer (GRP) strength member anchor is a structure adapted to axially fix a GRP strength member of a cable. Exemplary GRP strength member anchors include blades, clamps and adhesive securement locations. Exemplary blades include edges that cut into the GRP strength member. Exemplary blade configurations suitable for functioning GRP strength member anchors include single blades, opposing blades, and blades defining a v-shape. Clamps include structures that can be tightened to compress a GRP strength member. Clamps can include tightening components such as threaded fasteners, ratchets, crimps, gears, and pawls. Adhesive securement locations can include pockets, channels, passages, or other structures in which GRP strength members can be adhesively secured.

From the foregoing detailed description, it will be evident that modifications and variations can be made in the devices, systems, and methods of the disclosure without departing from the spirit or scope of the disclosure.

REFERENCE LETTERS/NUMBERS first reference axis A
retainer insertion axis B first reference axis C
depth D
central axis E
retainer insertion axis F
second reference axis G
second reference axis H
length L
width W
fiber optic cable fixation device 20
elongate main body 22
first end 24
second end 26
cable mounting side 28
cable tie retainer 30
cable strength member stop 32
first direction 33
fixation device mount 34
second direction 35
mounting opening 36
cable strength member wrapping location 37
first flange 38
device stacking sides 39
second flange 40
fiber optic cable fixation device 50
elongate main body 52
first end 54
second end 56
cable mounting side 58
cable tie retainer 60
cable strength member stop 62
fixation device mount 64
mounting opening 66
flexible retention latch 68
device stacking sides 69
strength member clamp 70
collar 72
threaded fastener 74
fiber optic cable 76
cable jacket 78
buffer tube 80
flexible strength members 82
tie wrap 84, 84a
free end 86
cable strength member wrapping location 88
tie wrap 90, 90a
felt tape 92a, 92b
protective jacket 94
pre-connectorized fiber optic cable arrangement 96
pre-connectorized end 98
flat drop fiber optic cable 100
cable jacket 102
relatively rigid strength members 104
buffer tube 106
mounting bracket 110
base 112
arm 114a, 114b
aperture 115a, 115b
ridge 116a, 116b
end 118a, 118b
mounting bracket 120
teeth 122
groove 124
through-hole 126
splice enclosure 128
circumferential mounting bracket 130
base 132
ridge 134
groove 136
side 138
projection 140
mounting plate 150
planar base 152
ridge 154
groove 156
projection 160

What is claimed is:

1. A fiber optic cable fixation device, comprising:
an elongate main body having a horizontal base with a length that extends between first and second ends of the elongate main body, the length extending along a first reference axis, the elongate main body defining a cable mounting side to which a cable can be attached;
a cable tie retainer at the first end of the elongate main body;
a cable strength member stop at the second end of the elongate main body, the cable strength member stop projecting at least partially in a first direction from the cable mounting side of the elongate main body;
a fixation device mount at an intermediate location along the length of the elongate main body, the fixation device mount defining a mounting opening that does not extend through the cable mounting side of the elongate main body, the mounting opening defining a retainer insertion axis that is offset in a second direction from the cable mounting side of the elongate main body, the second direction being opposite from the first direction, wherein the mounting opening includes a slot having a length that extends in a direction parallel to the first reference axis; and
a bracket including a base with first and second arms projecting from the base, wherein, when the fiber optic cable fixation device is mounted on a respective one of the first and second arms, the respective one of the first and second arms extend through the mounting opening along the retainer insertion axis.

2. The fiber optic cable fixation device of claim 1, wherein the cable tie retainer, the cable strength member stop and the fixation device mount are unitary with the elongate main body so as to form a unitary construction.

3. The fiber optic cable fixation device of claim 2, wherein the unitary construction includes metal or plastic.

4. The fiber optic cable fixation device of claim 1, wherein the cable tie retainer is T-shaped.

5. The fiber optic cable fixation device of claim 1, wherein the cable strength member stop includes a tab.

6. The fiber optic cable fixation device of claim 5, wherein a second reference axis is: a) parallel to the first reference axis; b) offset in the first direction from the first reference axis; c) intersects the tab; and d) does not intersect the cable tie retainer.

7. The fiber optic cable fixation device of claim 6, wherein the second reference axis coincides with the location of an axis of the cable secured to the fiber optic cable fixation device.

8. The fiber optic cable fixation device of claim 1, wherein a cable strength member wrapping location is defined between the fixation device mount and the second end of the elongate main body.

9. The fiber optic cable fixation device of claim 1, wherein the strength cable member stop is bendable to an orientation parallel to the first reference axis or is removable from the elongate main body.

10. The fiber optic cable fixation device of claim 1, wherein the fiber optic cable fixation device has a width measured in an orientation that is perpendicular to the first reference axis, the first direction and second direction, the width being less than or equal to an outer cross-dimension of the largest cable intended to be secured to the fiber optic cable fixation device.

11. The fiber optic cable fixation device of claim 1, further comprising a strength member clamp configured to mount between the fixation device mount and the second end of the elongate main body, the strength member clamp including a collar and a threaded fastener.

12. The fiber optic cable fixation device of claim 1, wherein the fixation device mount includes first and second flanges that project in the second direction and each define a mounting opening.

13. The fiber optic cable fixation device of claim 12, wherein the first and second flanges are parallel and the mounting openings include slots that have lengths which extend along the first reference axis and which are aligned along the retainer insertion axis.

14. The fiber optic cable fixation device of claim 1, wherein the fixation device mount includes a flexible retention latch.

* * * * *